(12) United States Patent
Kitajima et al.

(10) Patent No.: US 8,694,481 B2
(45) Date of Patent: Apr. 8, 2014

(54) COMPUTER PRODUCT, INFORMATION PROCESSING APPARATUS, AND INFORMATION PROCESSING METHOD

(75) Inventors: Shinya Kitajima, Kawasaki (JP);
Masazumi Matsubara, Kawasaki (JP);
Atsuji Sekiguchi, Kawasaki (JP);
Yukihiro Watanabe, Kawasaki (JP);
Yasuhide Matsumoto, Kawasaki (JP);
Yuji Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/343,058

(22) Filed: Jan. 4, 2012

(65) Prior Publication Data
US 2012/0239672 A1    Sep. 20, 2012

(30) Foreign Application Priority Data
Mar. 18, 2011    (JP) ................................ 2011-061187

(51) Int. Cl.
*G06F 17/30*    (2006.01)

(52) U.S. Cl.
USPC .......................................... 707/705; 707/758

(58) Field of Classification Search
USPC .................................. 707/705, 758
See application file for complete search history.

(56) References Cited

U.S. PATENT DOCUMENTS

| | | | |
|---|---|---|---|
| 5,410,496 A * | 4/1995 | Bolon et al. ....................... | 703/7 |
| 5,860,071 A * | 1/1999 | Ball et al. ....................... | 707/695 |
| 6,073,138 A * | 6/2000 | de l'Etraz et al. ............. | 707/748 |
| 6,226,792 B1 * | 5/2001 | Goiffon et al. ................. | 717/120 |
| 6,449,619 B1 * | 9/2002 | Colliat et al. ................. | 707/604 |
| 6,684,215 B1 * | 1/2004 | Saracco ......................... | 707/702 |
| 6,684,216 B1 * | 1/2004 | Duliba et al. ................. | 707/694 |
| 7,702,686 B2 * | 4/2010 | Meijer et al. ................. | 707/763 |
| 7,895,173 B1 * | 2/2011 | Dedu-Constantin et al. . | 707/705 |
| 7,899,834 B2 * | 3/2011 | Oezgen ......................... | 707/758 |
| 7,908,125 B2 * | 3/2011 | Yeh et al. .......................... | 703/2 |

FOREIGN PATENT DOCUMENTS

JP      2009-276911 A    11/2009
WO    WO 2010/067436    6/2010

\* cited by examiner

*Primary Examiner* — Kim Nguyen
(74) *Attorney, Agent, or Firm* — Fujitsu Patent Center

(57) ABSTRACT

A computer-readable medium stores therein an information processing program that causes a computer to execute a process. The process includes referring to relationship property information records that are stored in a storage device and indicate the type of each relationship property between configuration elements in a system and calculating a total count of configuration elements having a predetermined relationship property with a first configuration element, or a total count of relationship property information records having a predetermined relationship property, among relationship property information records concerning the first configuration element; executing conditional determination concerning the number of configuration elements having the predetermined relationship property with the first configuration element, among the calculated total count of configuration elements or the calculated total count of relationship property information records; and outputting a result of the determination.

11 Claims, 18 Drawing Sheets

CONSTRAINT TABLE ~600

| | CI TYPE | RE TYPE | NUMBER OF REs |
|---|---|---|---|
| 600-1 | Server | OwnedBy | 1 |
| 600-2 | Server | LocatedAt | 1 |
| 600-3 | Server | ManagedBy | 1 |
| 600-4 | User | Puchased | 1 |
| 600-5 | Hub | ConnectedTo | 4 |
| 600-6 | Server | ServerCPU | 2 |
| | ⋮ | ⋮ | ⋮ |

| CI TYPE | RE TYPE | NUMBER OF APPEARANCES ACCORDING TO NUMBER OF REs | | | |
|---|---|---|---|---|---|
| | | ONE | TWO | THREE | ... |
| Server | OwnedBy | 10 | 1 | 0 | ... |
| User | OwnedBy | 8 | 5 | 3 | ... |
| Server | LocatedAt | 12 | 0 | 0 | ... |
| User | Puchased | 10 | 2 | 0 | ... |
| Rack | Puchased | 6 | 2 | 3 | ... |
| ⋮ | ⋮ | ⋮ | ⋮ | ⋮ | ⋮ |

FIG.19

HISTORY INFORMATION TABLE — 1900

| CI TYPE | RE TYPE | NUMBER OF APPEARANCES ACCORDING TO NUMBER OF REs | | | DEGREE OF ACCU-RACY |
| --- | --- | --- | --- | --- | --- |
| | | ONE | TWO | THREE | |
| Server | OwnedBy | 10 | 1 | 0 | 10/11 |
| User | OwnedBy | 8 | 5 | 3 | 8/16 |
| Server | LocatedAt | 12 | 0 | 0 | 12/12 |
| User | Puchased | 10 | 2 | 0 | 10/12 |
| Rack | Puchased | 6 | 2 | 3 | 6/11 |
| ⋮ | ⋮ | ⋮ | ⋮ | ⋮ | ⋮ |

1900-1 — first row; 1900-5 — Rack row

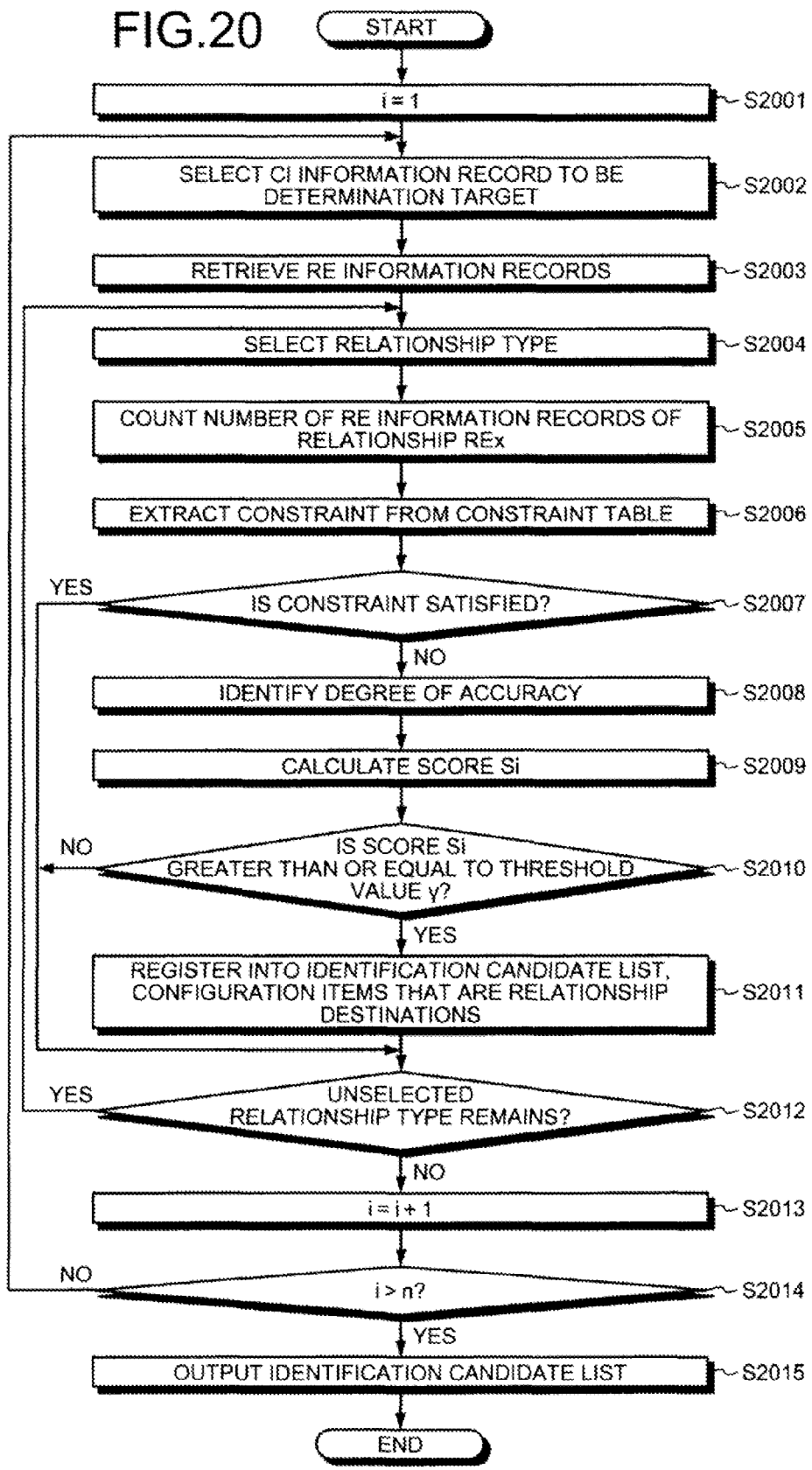

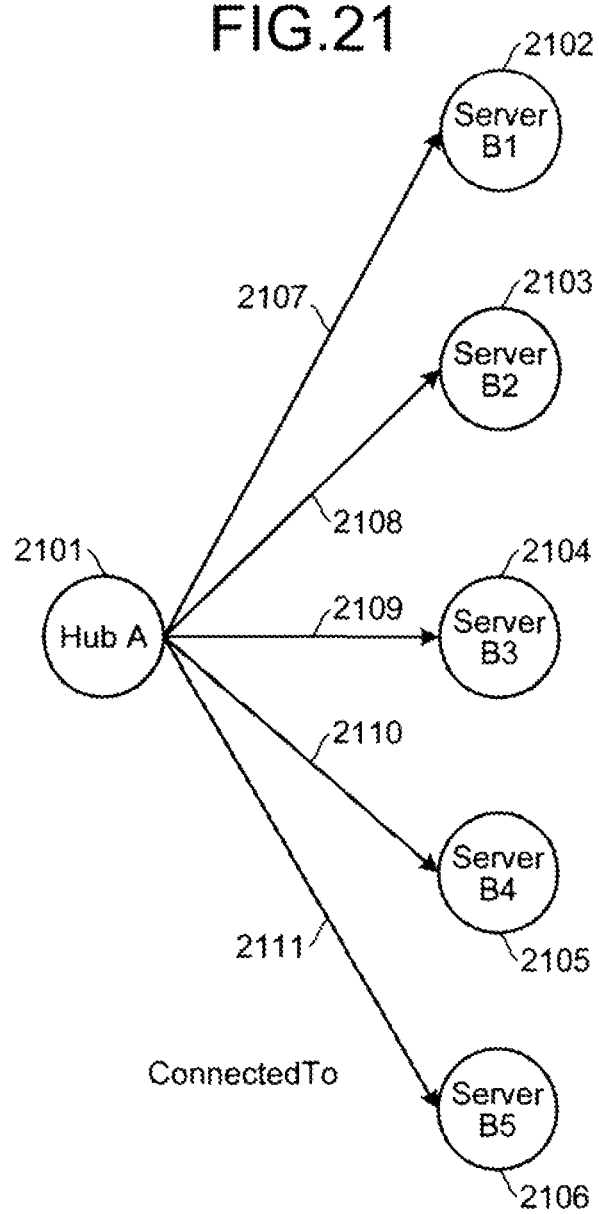

US 8,694,481 B2

COMPUTER PRODUCT, INFORMATION PROCESSING APPARATUS, AND INFORMATION PROCESSING METHOD

CROSS REFERENCE TO RELATED APPLICATIONS

This application is based upon and claims the benefit of priority of the prior Japanese Patent Application No. 2011-061187, filed on Mar. 18, 2011, the entire contents of which are incorporated herein by reference.

FIELD

The embodiments discussed herein are related to an information processing program, an information processing apparatus, and an information processing method that process information.

BACKGROUND

An "FCMDB (Federating Configuration Management DataBase) has recently been known that unitarily manages configuration information of an IT (Information Technology) system whose scale is becoming larger and that is becoming more complicated, by virtually consolidating a plural types of databases that manage the configuration information of the IT system.

The configuration information of an IT system is information on configuration elements such as hardware, software, documents, and services that configure the IT system. The configuration information of the IT system includes, for example, CIs (Configuration Items) that correspond to configuration elements and "Relationships" that represent the relationships among the CIs.

In the FCMDB, for example, an IProp (Identifying Property) is set and CIs representing substantially same items are identified with each other and reconciled and thereby, data in plural types of databases are virtually reconciled. The "IProp" is key information to correlate CIs with each other, that each represent an item substantially same as each other.

A prior art related thereto can be, for example, a technique to reduce obstructing factors that degrade the quality (usability, serviceability, portability, etc.) and reusability of existing software assets when new software is developed by reusing the existing software assets (see, e.g., Japanese Laid-Open Patent Publication No. 2009-276911).

However, according to the conventional technique, a problem arises that plural data may be present that indicate a substantially same content in a database such as an FCMDB. For example, it is difficult to accurately set IProps for a tremendous number of CIs in an IT system and, therefore, the CIs to originally be reconciled may be registered in an FCMDB without being reconciled.

SUMMARY

According to an aspect of an embodiment, a computer-readable medium stores therein an information processing program that causes a computer to execute a process. The process includes referring to relationship property information records that are stored in a storage device and indicate the type of each relationship property between configuration elements in a system and calculating a total count of configuration elements having a predetermined relationship property with a first configuration element, or a total count of relationship property information records having a predetermined relationship property, among relationship property information records concerning the first configuration element; executing conditional determination concerning the number of configuration elements having the predetermined relationship property with the first configuration element, among the calculated total count of configuration elements or the calculated total count of relationship property information records; and outputting a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is an explanatory diagram of an example of the storage content of the history information table (Part II).

FIG. 20 is a flowchart of an example of a procedure for information processing by the information processing apparatus according to the third embodiment.

FIG. 21 is an explanatory diagram of a set of the configuration items to be identification candidates.

DESCRIPTION OF EMBODIMENTS

Preferred embodiments of the present invention will be explained with reference to the accompanying drawings.

Figure 1:
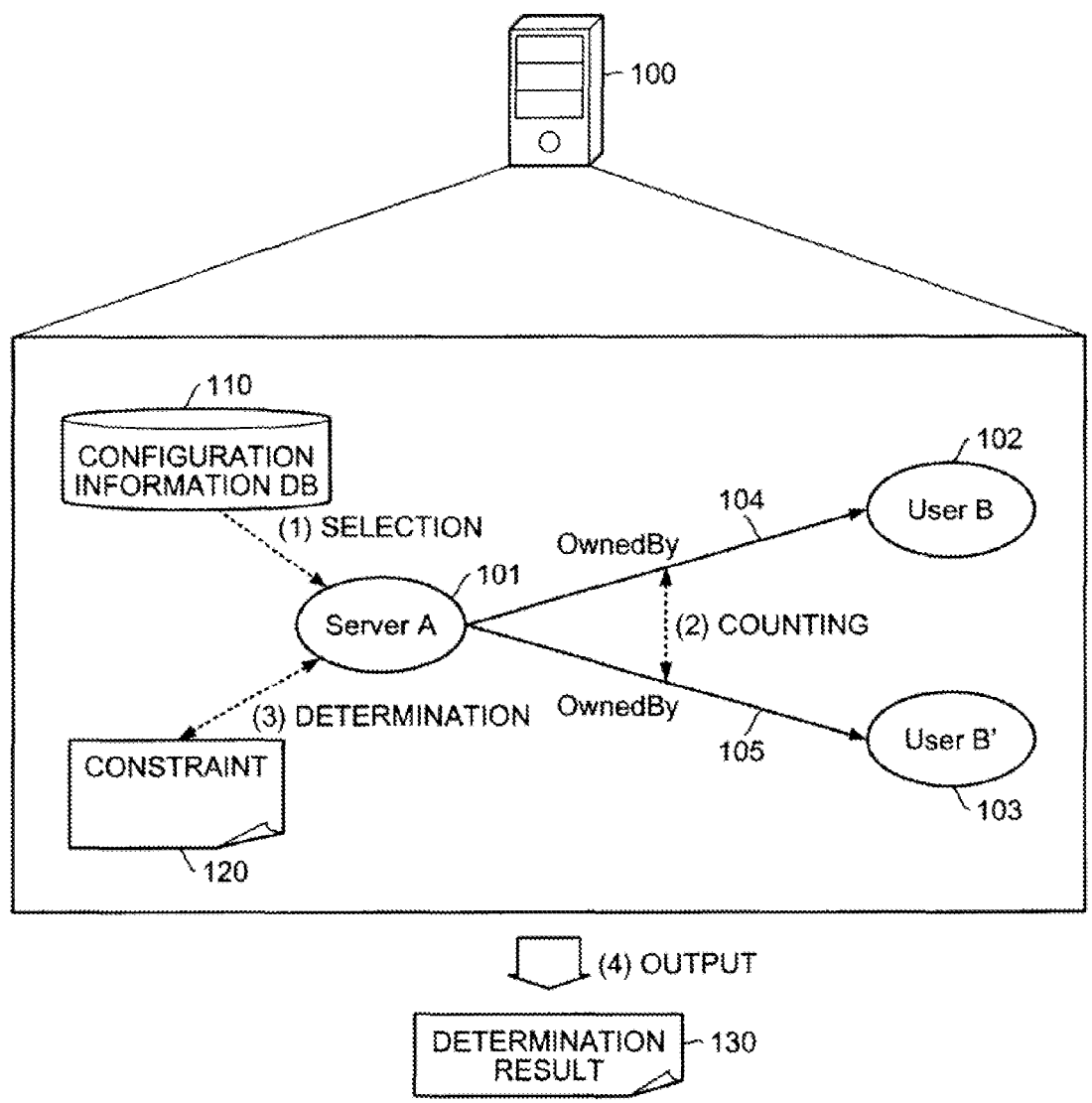
FIG. 1 is an explanatory diagram of an example of an information processing apparatus according to a first embodiment.

FIG. 1 is an explanatory diagram of an example of an information processing apparatus according to a first embodiment. In FIG. 1, an information processing apparatus 100 is a computer that includes a configuration information DB 110 and that assists identification of data to be reconciled.

The configuration information DB 110 is a database that stores therein configuration information that indicates configuration elements in an IT system (for example, an IT system 220 depicted in FIG. 2 described later) and relationship information that indicates relationship (relationship property) among the configuration elements. The "configuration element" can be, for example, hardware, software, a document, a service, or an asset that configures the IT system.

The configuration information includes, for example, information on an identifier, the element type (type), and an attribute of a configuration element. The type of element can be, for example: that representing the type of apparatus such as a server, a switch, a hub, or a rack; that representing the type of software such as an OS (Operating System) or an application, and that representing a user. The attribute of the configuration element can be, for example: that representing the name, a configuring part, or the state of the apparatus; and that representing the user name, the affiliated section, the telephone number, or the email address of the user. A specific example of the configuration information will later be described with reference to FIG. 5.

The relationship information includes, for example, the identifier of the relationship information, the type of the relationship (type) of the relationship among the configuration elements, and the identifiers of the configuration elements that are the relationship origin and the relationship destination. The type of relationship of the relationship can be, for example, that representing the relationship between an apparatus and its owner, that representing the relationship between the apparatus and the place of its installation, that representing the relationship between the apparatus and another apparatus that is its connection destination; and that representing the relationship between the apparatus and its configuring part. A specific example of the relationship information will later be described with reference to FIG. 5.

In FIG. 1: configuration information record 101 is information that indicates a server "A" (in FIG. 1, "ServerA") in an IT system; configuration information 102 is information that indicates a user "B" (in FIG. 1, "UserB") in the IT system; and configuration information 103 is information that indicates a user "B'" (in FIG. 1, "UserB'") in the IT system. However, the users B and B' are the same one user.

Relationship information 104 is information that indicates the relationship (in FIG. 1, "OwnedBy") between the server A indicated by the configuration information record 101 and the user B indicated by the configuration information 102. For example, the relationship information 104 indicates the relationship between the server A and the user B that is the owner of the server A. Relationship information 105 is information that indicates the relationship (in FIG. 1, "OwnedBy") between the server A indicated by the configuration information record 101 and the user B' indicated by the configuration information 103. For example, the relationship information 105 indicates the relationship between the server A and the user B' that is the owner of the server A.

On the configuration information DB 110, a plurality of configuration elements are identified with each other that indicate substantially same items, and configuration information each indicating configuration element are reconciled and are stored. However, the configuration information indicating the substantially same configuration elements may be stored as separate data due to a mistake made in setting an IProp.

In the embodiment, configuration information 102 and 103 indicating the substantially same user are stored in the configuration information DB 110 as separate data. An "IProp" is key information to correlate configuration elements with each other that indicate substantially same items. An attribute is set as an IProp such as, for example, the name of a server or an MAC (Media Access Control) address.

In the first embodiment, the information processing apparatus 100 is proposed that facilitates the identification of configuration information to be reconciled in the configuration information DB 110. An example of a procedure for information processing by the information processing apparatus 100 according to the first embodiment (the following (1) to (4)) will be described.

(1) The information processing apparatus 100 selects any one configuration information record in the configuration information DB 110. In this case, a configuration information record 101 is selected from the configuration information DB 110.

(2) The information processing apparatus 100 counts the number of configuration elements each having a predetermined relationship with the server A indicated by the configuration information record 101 selected or the number of relationship information that each indicate a predetermined relationship between the server A indicated by the configuration information record 101 and another configuration element, among the plural relationship information records stored in the configuration information DB 110. Counting the number of configuration elements each having the predetermined relationship with the server A indicated by the configuration information record 101 and counting the number of relationship information records that each indicate the predetermined relationship between the server A indicated by the configuration information record 101 and another configuration element are synonymous.

In this case, the relationship information 104 indicating the relationship of "Ownedby" between the server A and the user B and the relationship information 105 indicating the relationship of "OwnedBy" between the server A and the user B' are present in the configuration information DB 110. Therefore, the number "two" of the relationship information 104 and 105 is counted. The "OwnedBy" is a relationship type that represents the relationship between an apparatus and its owner.

(3) The information processing apparatus 100 determines whether the number "two" of the relationship information 104 and 105 counted satisfies a constraint 120 that stipulates the number of configuration elements that are the relationship destinations each having the relationship of "OwnedBy" with a configuration element of the element type same as the element type "server" of the server A.

The constraint 120 stipulates the number "one" of the configuration element that is the relationship destination having the relationship of "OwnedBy" with the configuration element of the element type "server". For example, the constraint 120 stipulates that the owner of an apparatus of the element type "server" is one. In the above, the number of the relationship information 104 and 105 is "two" and, therefore, the information processing apparatus 100 determines that the number "two" does not satisfy the constraint 120.

The fact that the configuration information record 101 does not satisfy the constraint 120 depicts that the users B and B' each having the relationship of "OwnedBy" with the server A indicated by the configuration information record 101 may be the same one user, suggestive of the configuration information 102 indicating the user B and the configuration information 103 indicating the user B' requiring reconciliation.

(4) The information processing apparatus 100 outputs a determination result 130. For example, the information processing apparatus 100 outputs the determination result 130 that indicates the users B and B' each having the relationship of "OwnedBy" with the server A indicated by the configuration information record 101 that does not satisfy the constraint 120. A manager of the information processing apparatus 100 refers to the determination result 130 and thereby, is able to identify the configuration information 102 and 103 with each other that may have to be reconciled in the configuration information DB 110.

In this manner, according to the information processing apparatus 100 according to the first embodiment, identification is able to be facilitated of the configuration information that have to be reconciled of a group of configuration information stored in the configuration information DB 110. As a result, the manager of the information processing apparatus 100 is able to easily find the configuration elements that have to be identified with each other (the users B and B').

Figure 2:
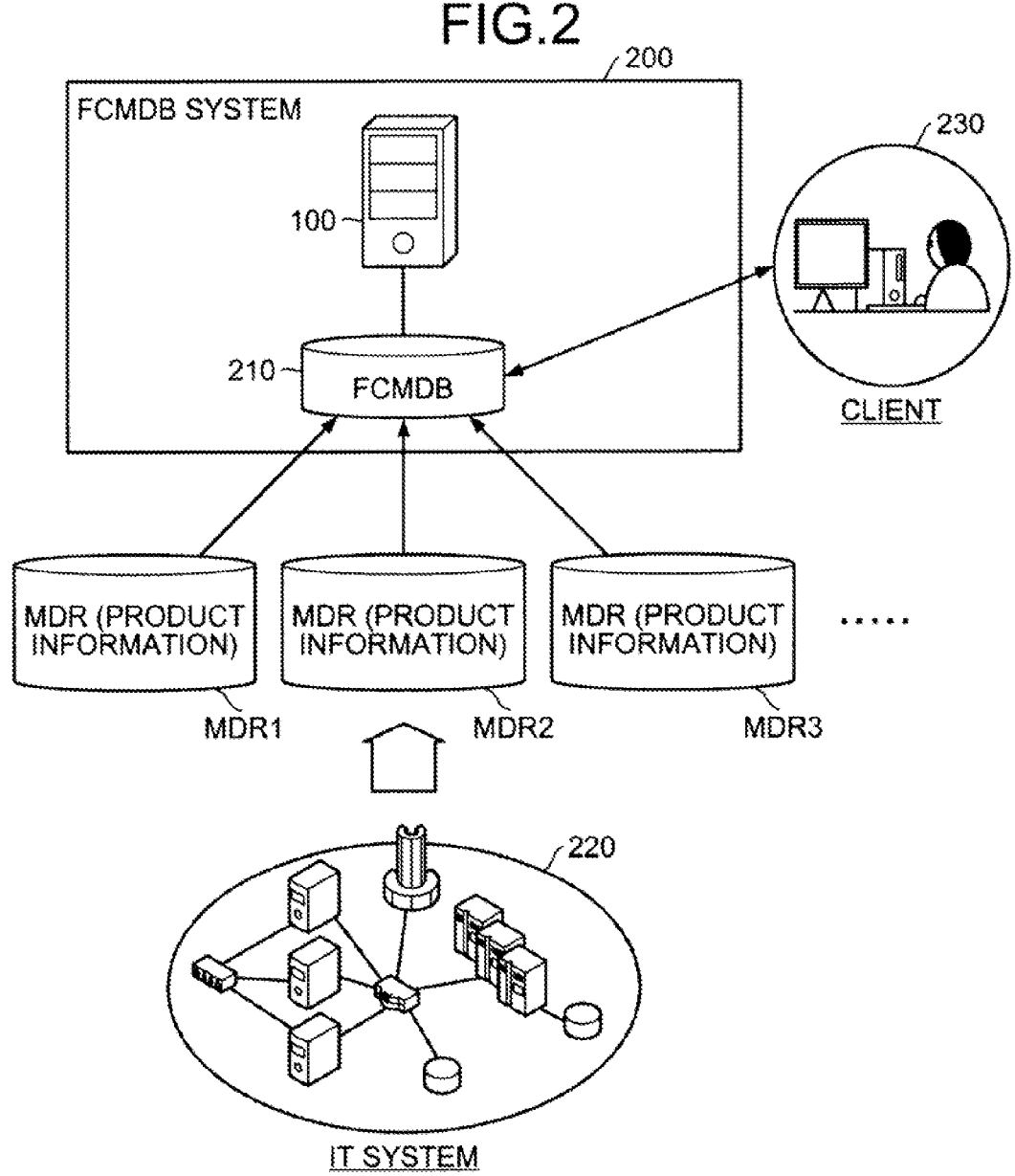
FIG. 2 is a diagram of a system configuration of an example of an FCMDB system according to the first embodiment.

FIG. 2 is a diagram of the system configuration of an example of an FCMDB system according to the first embodiment. In FIG. 2, the FCMDB system 200 includes the information processing apparatus 100 and an FCMDB 210.

The "FCMDB 210" is a database that unitarily manages the configuration information of the IT system 220 by virtually consolidating multiple types of MDR (Management Data Repository). The types of MDR (for example, MDR 1 to MDR 3) are operation management databases that each retain operation management data that is different from each other, such as design information, product information, or performance information. The FCMDB 210 corresponds to the configuration information DB 110 depicted in FIG. 1.

For example, the FCMDB 210 stores therein CI information records that indicates a configuration item (CI) in the IT system 220 and Relationship information that indicates the relationship (Relationship) between configuration items (hereinafter, "RE information records"). The CI information records correspond to the above configuration information (for example, each of configuration information record 101 to 103) and the RE information records correspond to the above relationship information (for example, each of relationship information 104 and 105).

In the FCMDB system 200, the plural types of MDR are virtually consolidated and thereby, the configuration items of the IT system 220 and the relationships among the configuration items are unitarily managed on the FCMDB 210. According to the FCMDB system 200, data of the plural types of MDR (the CI information records and the RE information records) are able to be unitarily presented to a client 230.

Figure 3:
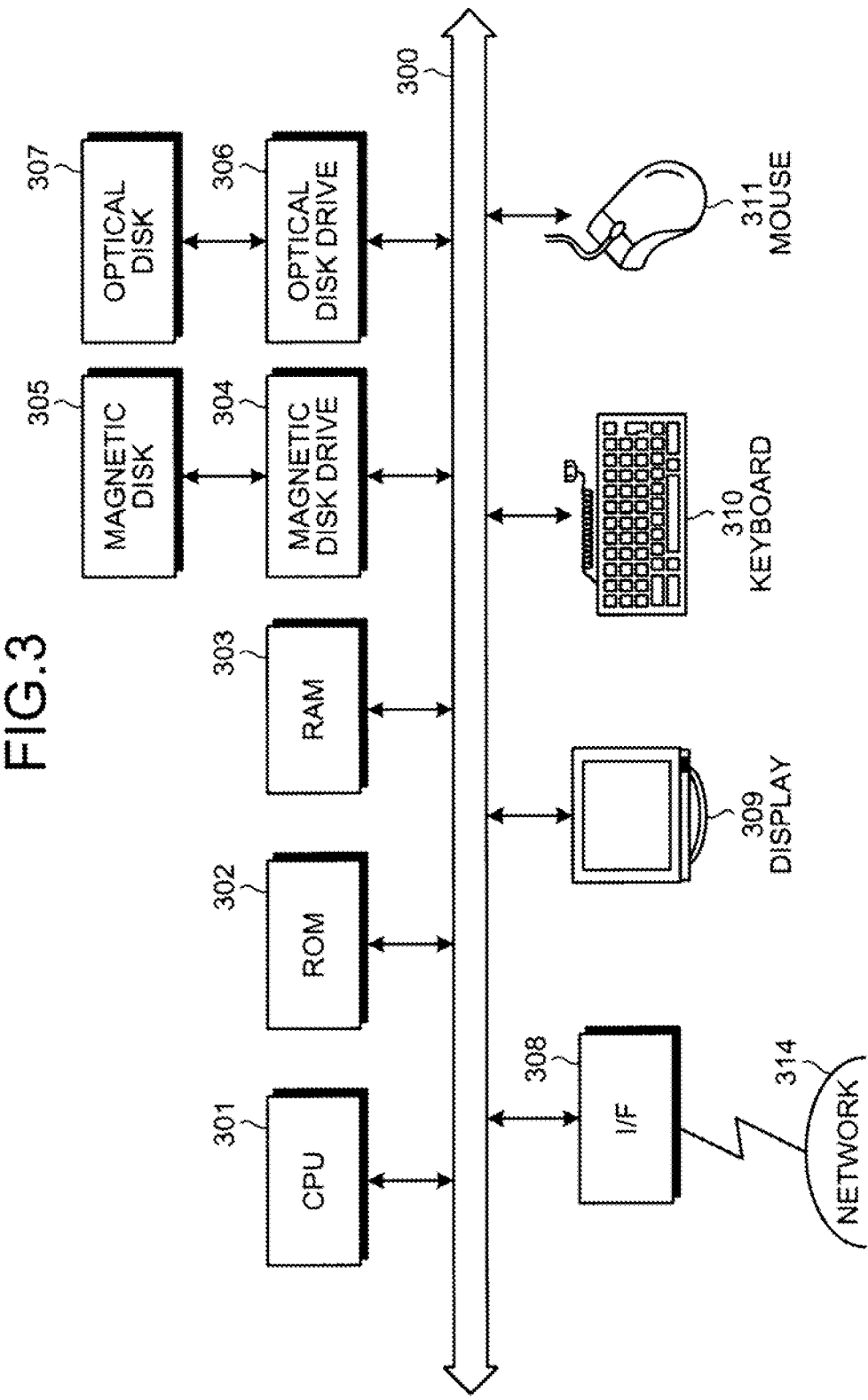
FIG. 3 is a block diagram of a hardware configuration of an information processing apparatus according to the embodiments.

FIG. 3 is a block diagram of a hardware configuration of an information processing apparatus according to the embodiments. As depicted in FIG. 3, the information processing apparatus includes a central processing unit (CPU) 301, a read-only memory (ROM) 302, a random access memory (RAM) 303, a magnetic disk drive 304, a magnetic disk 305, an optical disk drive 306, an optical disk 307, an interface (I/F) 308, a display 309, a keyboard 310, and a mouse 311, respectively connected by a bus 300.

The CPU 301 governs overall control of the information processing apparatus. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The I/F 308 is connected to a network 314 such as a local area network (LAN), a wide area network (WAN), and the Internet through a communication line and is connected to other apparatuses through the network 314. The I/F 308 administers an internal interface with the network 314 and controls the input/output of data from/to external apparatuses. For example, a modem or a LAN adaptor may be employed as the I/F 308.

The display 309 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 508.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

Figure 4:
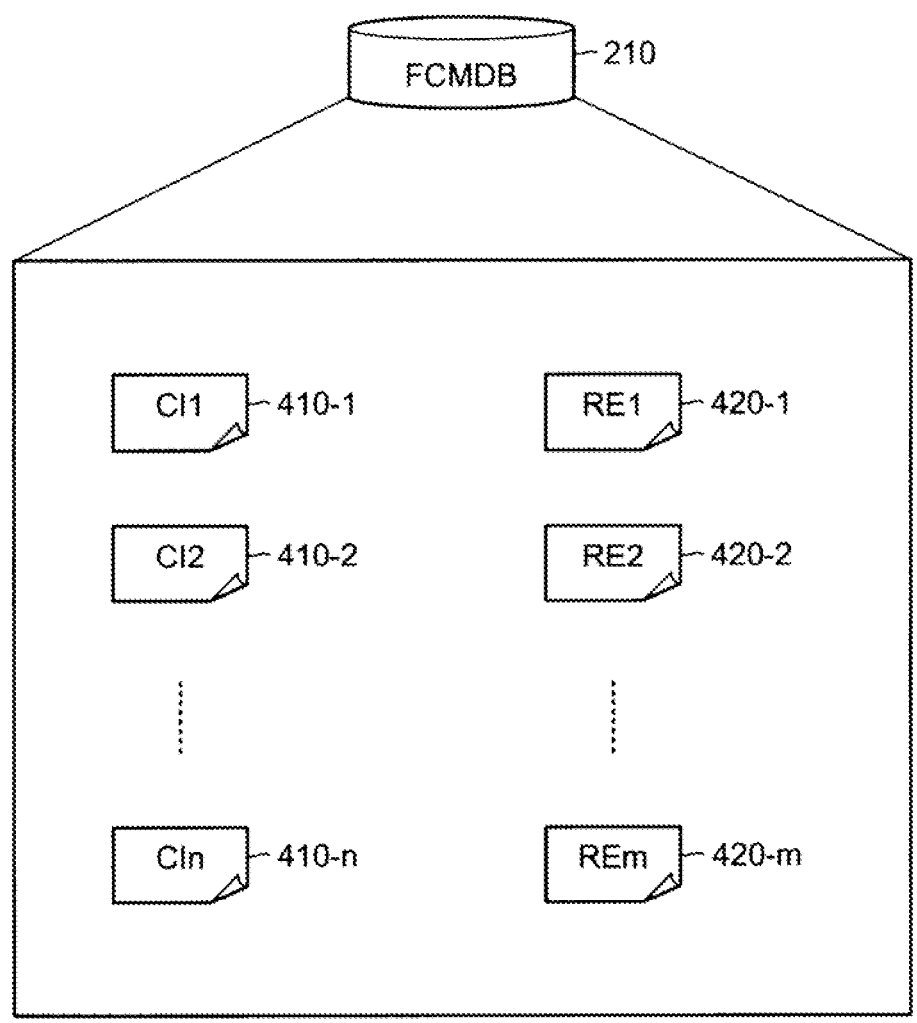
FIG. 4 is an explanatory diagram of an example of the storage content of the FCMDB.

FIG. 4 is an explanatory diagram of an example of the storage content of the FCMDB. In FIG. 4, the FCMDB 210 stores therein IC information 410-1 to 410-$n$ and RE information records 420-1 to 420-$m$. In FIG. 4, "CI 1, CI 2, . . . , CI n" are identifiers of configuration items used herein for the description. In FIG. 4, "RE 1, RE 2, . . . , RE m" are identifiers of the "Relationships" used herein for the description.

For example, the CI information records 410-1 to 410-$n$ are configuration information that indicate the configuration items CI 1 to CI n in the IT system 220, and the RE information records 420-1 to 420-$m$ are relationship information that indicate the "Relationships" among the configuration items in the IT system 220. A specific example of each of the CI information records and the RE information records will be described.

Figure 5:
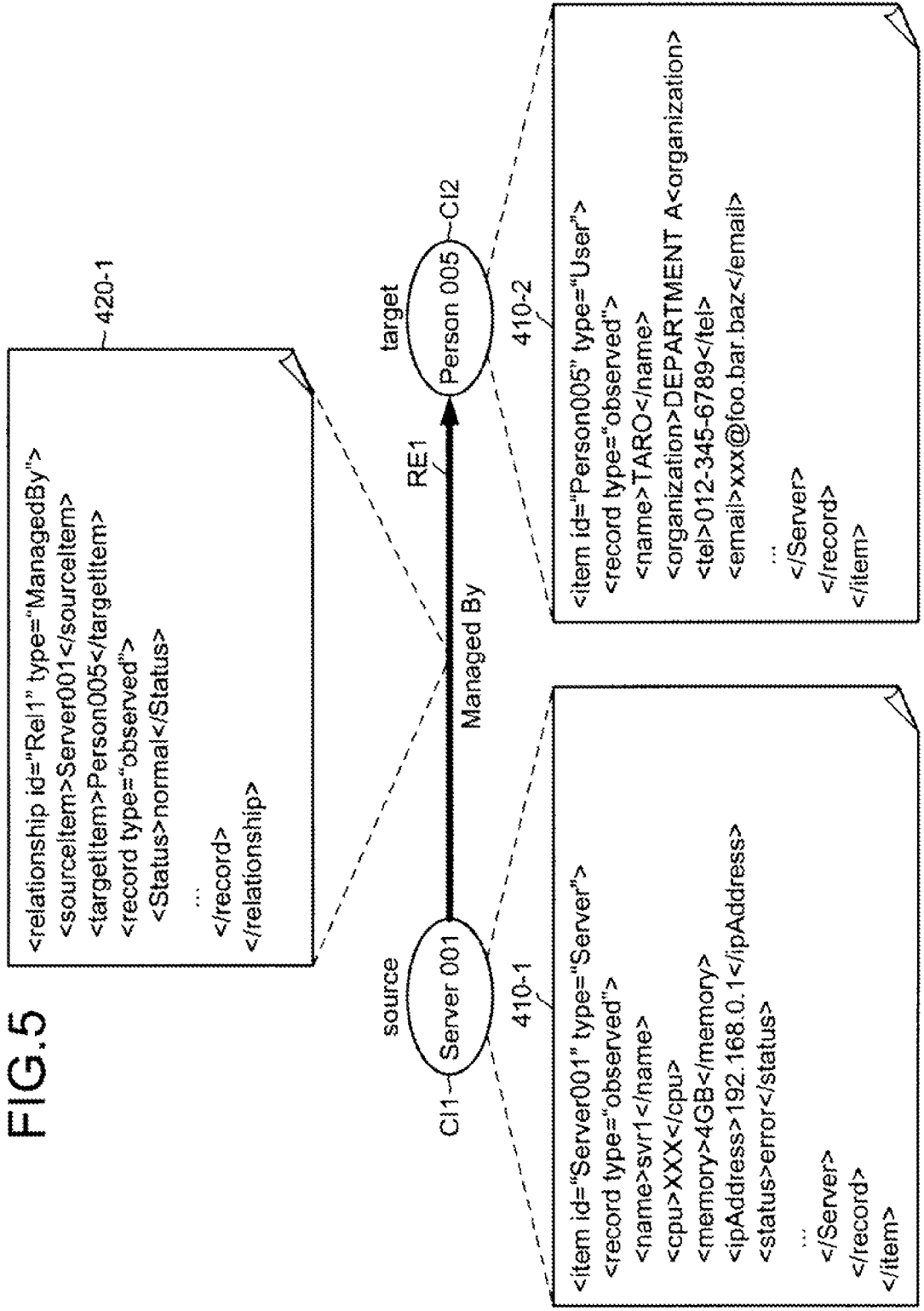
FIG. 5 is an explanatory diagram of an example of CI information records and RE information records.

FIG. 5 is an explanatory diagram of the specific example of the CI information records and the RE information records. FIG. 5 depicts the CI information records 410-1 indicating the configuration item CI 1, the CI information records 410-2 indicating the configuration item CI 2, and the RE information records 420-1 indicating "Relationship" RE 1 between the configuration items CI 1 and CI 2. In FIG. 5, a portion is extracted and depicted for each of the CI information records 410-1 and 410-2 and the RE information records 420-1.

The CI information record 410-1 includes information concerning the item ID (id), the type (type), and the attribute of the configuration item CI 1. The "item ID" is the identifier of the configuration item. For example, the "identifier" is usable, that is to uniquely identify a configuration item on each MDR before the consolidation thereof into the FCMDB 210 as the item ID.

The "type" is the element type to classify a configuration item. The "attribute" characterizes a configuration item and is expressed using an attribute name and an attribute value. For the CI information records 410-1, the name (name), the configuring part (CPU and memory), the IP address (ipAddress), and the status (status) are shown as the attributes of the configuration item CI 1.

The CI information record 410-2 includes information on the item ID (id), the type (type), and the attribute of the configuration item CI 2. For the CI information records 410-2, the name (name), the affiliated section (organization), the telephone number (tel), and the email address (email) are shown.

The RE information record 420-1 includes information on Relationship ID (id), the type (type), the configuration item (sourceItem), and the configuration item (targetItem) of "Relationship" RE 1. A direction is determined for each "Relationship" and, herein, the origin of each "Relationship" is referred to as "source" and an addressee thereof is referred to as "target".

Hereinafter, an arbitrary configuration item of the configuration items CI 1 to CI n is denoted by "configuration item CI i" (i=1, 2, ..., n).

A constraint table 600 is stored in a storing apparatus such as, for example, the RAM 303, the magnetic disk 305, and the optical disk 307 that are depicted in FIG. 3.

Figures 6, 7:
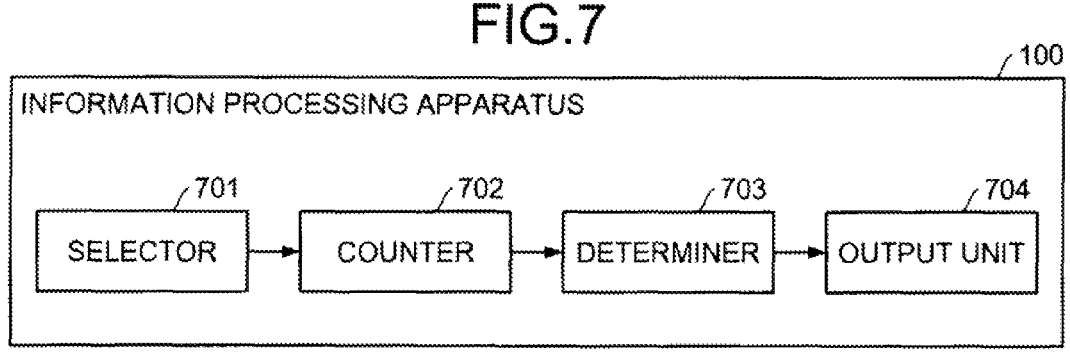
FIG. 6 is an explanatory diagram of an example of the storage content of the constraint table.
FIG. 7 is a block diagram of a functional configuration of the information processing apparatus according to the first embodiment.

FIG. 6 is an explanatory diagram of an example of the storage content of the constraint table. In FIG. 6, the constraint table 600 has fields for the CI type, the RE type, and the number of REs. Constraints each for a combination of a CI type and an RE type (for example, constraints 600-1 to 600-6) are stored in the constraint table 600 as a record by setting information in the fields.

The "CI type" is the element type of the configuration item. A CI type can be, for example, "Server", "User", "Person", "Rack", "Switch", or "Hub". The "RE type" is the relationship type of "Relationship" between configuration items. An RE type can be, for example, "OwnedBy", "LocatedAt", "ManagedBy", "Purchased", "ConnectedTo", or "ServerCPU".

"OwnedBy" represents "Relationship" between an apparatus and its owner. "LocatedAt" represents "Relationship" between an apparatus and the place of its installation. "ManagedBy" represents "Relationship" between an apparatus and its manager. "Purchased" represents "Relationship" between an apparatus and its purchaser. "ConnectedTo" represents "Relationship" between an apparatus and another apparatus that is the connection destination thereof. "ServerCPU" represents "Relationship" between a server and a CPU that is mounted on the server.

The "number of REs" is the number of configuration items that are the relationship destinations each having "Relationship" of an RE type (relationship type) with a configuration item of a CI type (element type).

For example, the constraint 600-1 stipulates the number "one" of the configuration item that is the relationship destination having "Relationship" of the RE type "OwnedBy" with a configuration item of the CI type "Server". The constraint 600-5 stipulates the number "four" of the configuration items that are the relationship destinations each having "Relationship" of the RE type "ConnectedTo" with a configuration item of the CI type "Hub".

FIG. 7 is a block diagram of the functional configuration of the information processing apparatus according to the first embodiment. In FIG. 7, the information processing apparatus 100 includes a selector 701, a counter 702, a determiner 703, and an output unit 704. For example, the functional units (the selector 701 to the output unit 704) realize their functions, for example, by causing the CPU 301 to execute programs stored in the storing apparatus such as the ROM 302, the RAM 303, the magnetic disk 305, or the optical disk 307, or by the I/F 308 that are depicted in FIG. 3. The processing results of the functional units are stored in the storing apparatus such as, for example, the RAM 303, the magnetic disk 305, or the optical disk 307.

The selector 701 selects the CI information records 410-i that is the determination target, from the CI information records 410-1 to 410-n stored on the FCMDB 210. The "determination target" is a CI information record that indicates a configuration item that is the relationship origin to be the target for which it is determined whether IC information indicating configuration items that are the relationship destinations must be reconciled. The CI information records 410-i that is the determination target may be selected by an operation input of a user using the keyboard 310 and the mouse 311 depicted in FIG. 3.

The counter 702 counts the number of the RE information records each indicating predetermined "Relationship" between the configuration item CI i indicated by the CI information records 410-i selected (hereinafter, "selected configuration item CI i") and the configuration items that are the relationship destinations, of the RE information records 420-1 to 420-m stored on the FCMDB 210.

The counter 702 may count the number of configuration items each having the predetermined "Relationship" with the selected configuration item CI i. In this case, counting the number of the RE information records each indicating the predetermined "Relationship" between the selected configuration item CI i and the configuration items that are the relationship destinations, and counting the number of configuration items each having the predetermined "Relationship" with the selected configuration item CI i mean similarly to each other.

Herein, in the description below, the case will be described as an example where the number is to be counted of the RE information records each indicating the predetermined "Relationship" between the selected configuration item CI i and the configuration items that are the relationship destinations. For example, the counter 702 first retrieves from the FCMDB 210 the RE information records whose item ID of the selected configuration item CI i is set to be "sourceItem" or "targetItem" of the RE information records.

As an example, it is assumed that the configuration item CI 1 depicted in FIG. 5 is the selected configuration item CI i. In this case, for example, the counter 702 retrieves from the FCMDB 210 the RE information records 420-1 (see FIG. 5) whose "sourceItem" is set to be an item ID "Server001".

Thereafter, the counter 702 classifies the RE information records retrieved by relationship type of "Relationship". The "relationship type of "Relationship"" refers to the RE type of "Relationship" set as the "type" of the RE information records. The counter 702 counts the number of RE information records classified by relationship type of "Relationship".

Thereby, the counter 702 counts the number of RE information records each indicating "Relationship" of the relationship type between the selected configuration items CI i and the configuration item that is the relationship destination, for each relationship type of "Relationship".

In the description hereinafter: "Relationship" of an arbitrary relationship type of "Relationships" each between the selected configuration item CI i and the configuration item that is the relationship destination, will be denoted by "Relationship REx"; and the number of the RE information records of "Relationship" REx will be denoted by "the number Nx of RE information records".

The determiner 703 determines whether the number Nx counted of RE information records of "Relationship" REx satisfies the constraint that stipulates the number of the configuration items that are the relationship destinations each having "Relationship" REx with the configuration item of the element type same as the element type of the selected configuration item CI i.

For example, the determiner 703 extracts the constraint whose CI type is set to be the "element type of the selected configuration item CI i" and whose RE type is set to be "the relationship type of "Relationship" REx". Thereby, the determiner 703 is able to extract the constraint that stipulates the number of configuration items that are the relationship destinations each having "Relationship" REx with the selected configuration item CI i.

The determiner 703 determines, for example, whether the number Nx of RE information records of "Relationship" REx is equal to or smaller than the number of REs stipulated by the constraint extracted. Thereby, the determiner 703 is able to determine whether the number of "Relationships" REx connected to the selected configuration item CI i is equal to or smaller than the number REs stipulated by the constraint.

It is assumed that, for example, the element type of the selected configuration item CI i is "Server" and the relationship type of "Relationship" RE is "OwnedBy". In this case, the determiner 703 extracts the constraint 600-1 whose CI type is set to be "Server" and whose RE type is set to be "OwnedBy" from the constraint table 600.

The determiner 703 determines whether the number Nx counted of RE information records of "Relationship" REx is equal to or smaller than the number of RE "one" that is stipulated by the constraint 600-1 extracted. Thereby, the determiner 703 is able to recognize that many "Relationships" REx whose number exceeds the number of REs stipulated in the constraint 600-1, are connected to the selected configuration item CI i.

The output unit 704 outputs the determination results determined. For example, the output unit 704 may output the determination result that indicates the selected configuration item CI i whose number Nx of the RE information records of "Relationship" REx is determined not to satisfy the constraint. The output unit 704 may output the determination result (for example, identification candidate lists 800 and 900 respectively depicted in FIGS. 8 and 9 described later) that indicates the configuration items that are the relationship destinations each having "Relationship" REx with the selected configuration item CI i determined not to satisfy the constraint.

The output form can be, for example, displaying on the display 309, output by printing by a printer not depicted, or transmission to an external computer by the I/F 308. The output may be stored in the storing apparatus such as the RAM 303, the magnetic disk 305, or the optical disk 307.

Figure 8:
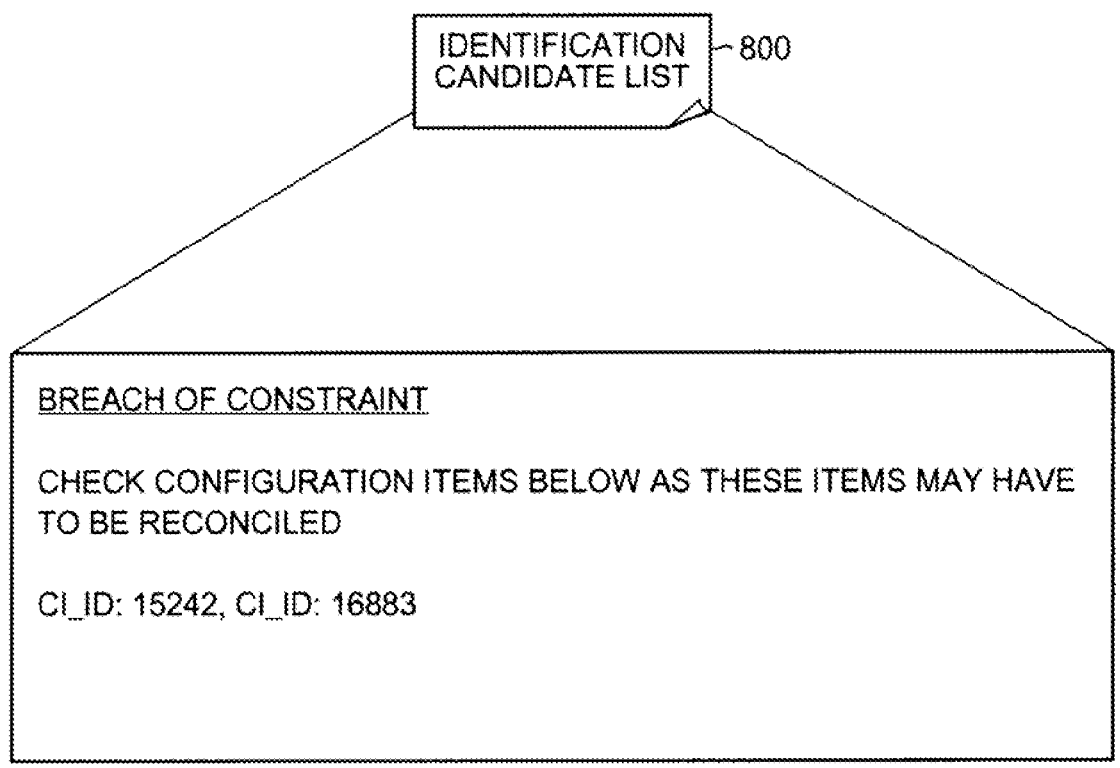
FIG. 8 is an explanatory diagram of an example of an identification candidate list (Part I).

FIG. 8 is an explanatory diagram of a specific example of an identification candidate list (Part I). In FIG. 8, the identification candidate list 800 is information that indicates "CI_ID" of each configuration item to be an identification candidate. The "configuration item to be an identification candidate" is a configuration item that is the relationship destination having "Relationship" REx with the selected configuration item CI that does not satisfy the constraint. The "CI_ID" is, for example, an identifier of the configuration item capable of being uniquely distinguished on the FCMDB 210.

According to the identification candidate list 800, configuration items to be identification candidates are able to be identified from the configuration items CI 1 to CI n.

Figure 9:
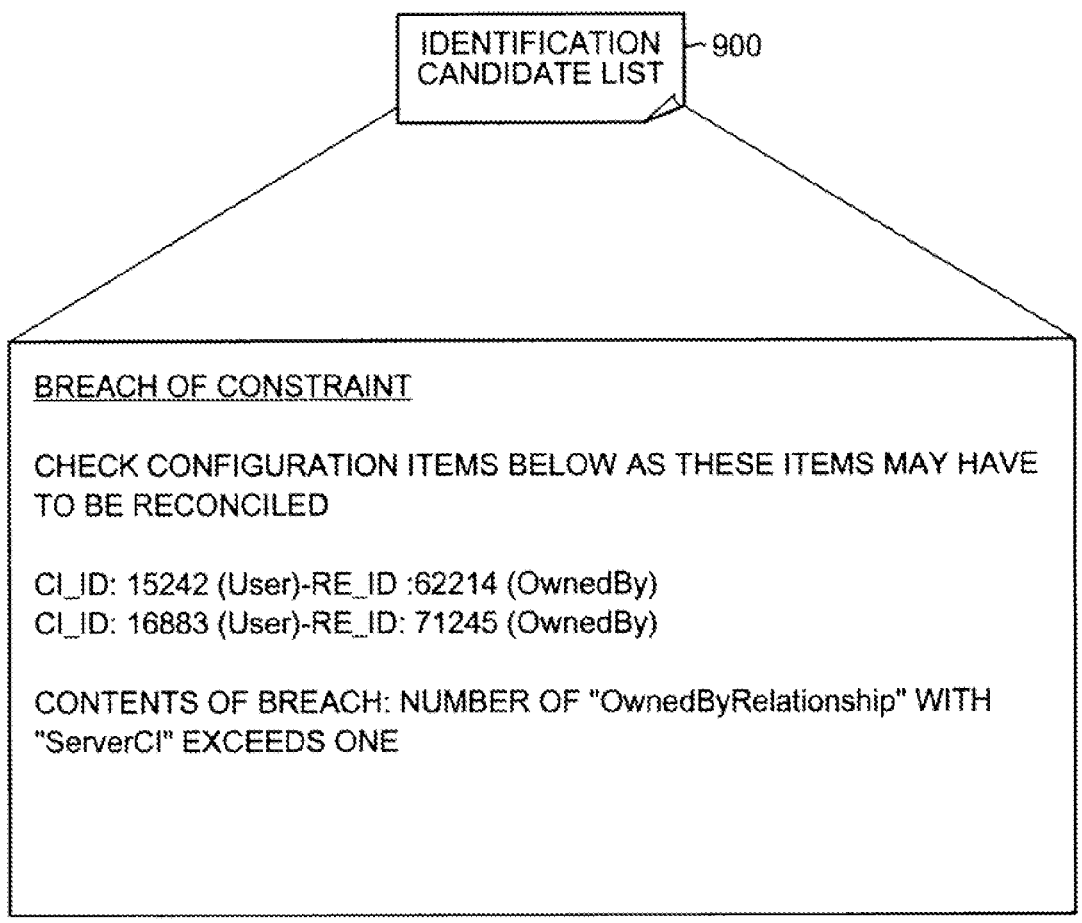
FIG. 9 is an explanatory diagram of the example of the identification candidate list (Part II).

FIG. 9 is an explanatory diagram of the specific example of the identification candidate list (Part II). In FIG. 9, an identification candidate list 900 is information that indicates the CI_ID and the element type of each of the configuration items that are identification candidates, and RE_ID and the relation type of each of "Relationships" that are determined to breach the constraint. The "RE_ID" is an identifier of "Relationship" capable of being uniquely distinguished on the FCMDB 210.

According to the identification candidate list 900, the configuration items to be the identification candidates are able to be identified from the configuration items CI 1 to CI n. According to the identification candidate list 900, the relationship property between the configuration item to be an identification candidate and the configuration item that is the relationship origin, and the content of the breach of the constraint can be understood.

In the above description, whether the number Nx of the RE information records of "Relationship" REx is equal to or smaller than the number of REs that is stipulated by the constraint, is determined as an example of determination of whether the constraint is satisfied. However, the determination is not limited to the above. For example, the determiner 703 may determine whether the number Nx of the RE information records of "Relationship" REx coincides with the number of REs stipulated by the constraint.

Exemplary reconciliation will be described of CI information records that each indicate the configuration item identified from the identification candidate list 800 depicted in FIG. 8.

Figure 10:
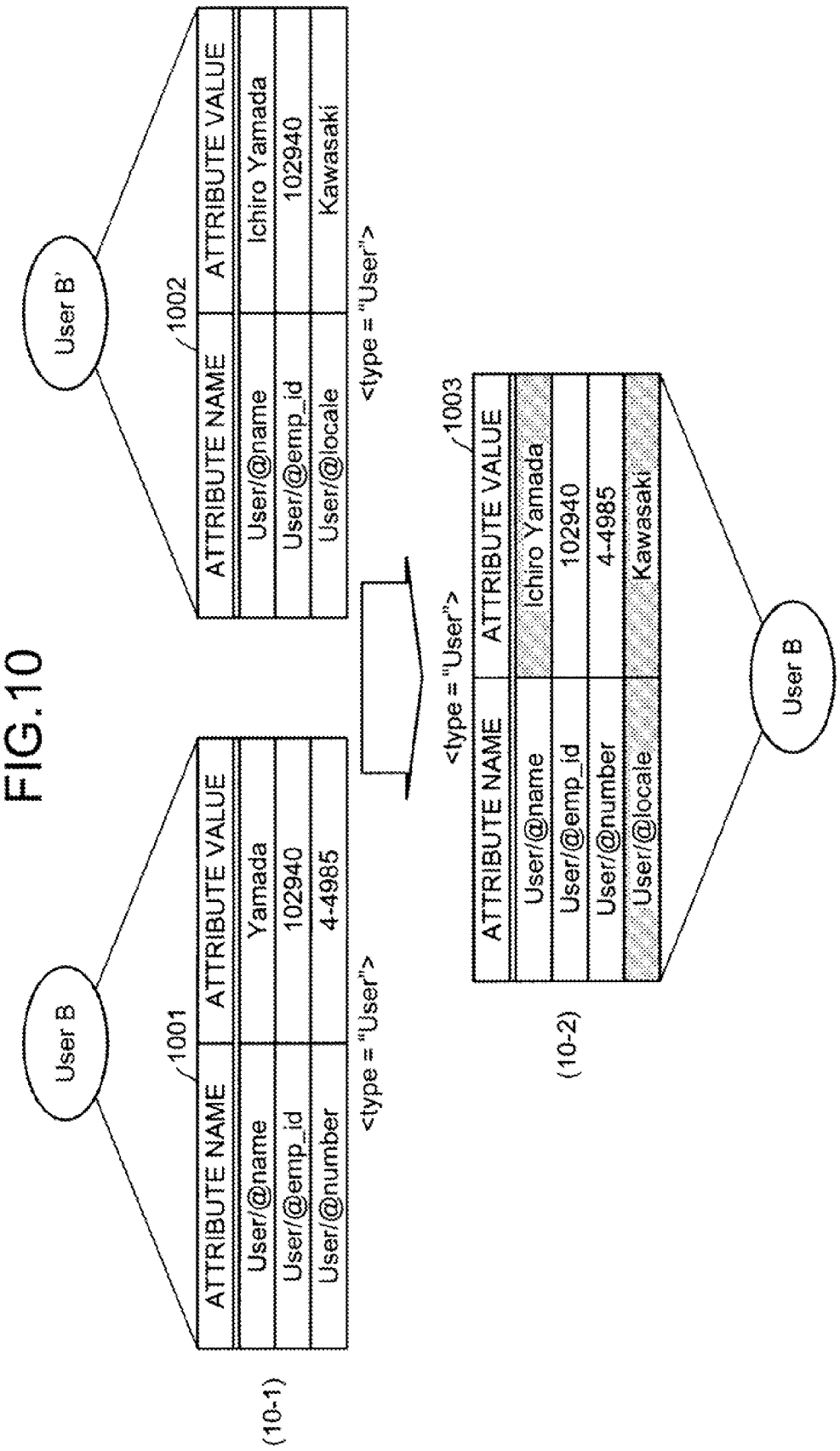
FIG. 10 is an explanatory diagram of an example of reconciliation of CI information records.

FIG. 10 is an explanatory diagram of an example of reconciliation of CI information records. CI information records 1001 and 1002 are CI information records concerning the FCMDB 210 indicating the configuration items identified using CI_ID listed in the identification candidate list 800.

The CI information record 1001 indicates the configuration item of a CI_ID "15242". The item ID of this configuration item is "UserB" and the element type (type) thereof is "User". The CI information record 1002 indicates the configuration item of CI_ID "16883". The item ID of this configuration item is "UserB'" and the element type thereof is "User".

In this case, the case is assumed where "User/@name (the name of the configuration item of the element type "User")" is set as the IProp and, therefore, the CI information records 1001 and 1002 to originally be reconciled are registered on the FCMDB 210 as separate pieces. Therefore, the two configuration items indicating the same user are present on the FCMDB 210.

The manager of the FCMDB system 200 determines, for example, whether the configuration item indicated by the CI information records 1001 and that indicated by the CI information records 1002 are the same configuration item. For example, the employee ID of the CI information records 1001 and that of the CI information records 1002 are same and, therefore, the manager determines that the configuration items are same.

When the manager determines that the configuration items are same, the manager, for example, changes the IProp and again executes the reconciliation for the FCMDB 210. For example, the manager sets "User/@emp_id (the employee ID of the element type "User")" as the IProp and executes the reconciliation for the FCMDB 210.

In (10-2) of FIG. 10, the CI information records 1001 and 1002 are reconciled and thereby, a new CI information record 1003 is generated. The CI information record 1003 is CI information records formed by reflecting the content of the CI information record 1002 onto the CI information record 1001. For example, the attribute value of the attribute name "user/@name" is changed from "Yamada" to "Ichiro Yamada" and the attribute value "Kawasaki" of the attribute name "User/@locale" is added. As a result, the CI information records 1001 and 1002 both indicating the same configuration item are reconciled and the CI information record 1003 is registered on the FCMDB 210.

In this manner, according to the identification candidate list 800, the CI information records 1001 and 1002 to be reconciled can be easily identified with each other on the FCMDB 210 and the configuration item to be identified is able to be found. The mistake made in setting the IProp is can be noticed because the fact is known that the CI information records 1001 and 1002 to originally be reconciled are not yet reconciled.

However, though the IProp is changed to reconcile the CI information records 1001 and 1002 in the above, the procedure is not limited to the above. For example, the manager may change the attribute value of the attribute name "User/@name" of the CI information records 1001 to "Ichiro Yamada". Thereby, the CI information records 1001 and 1002 are reconciled without changing the IProp.

Figure 11:
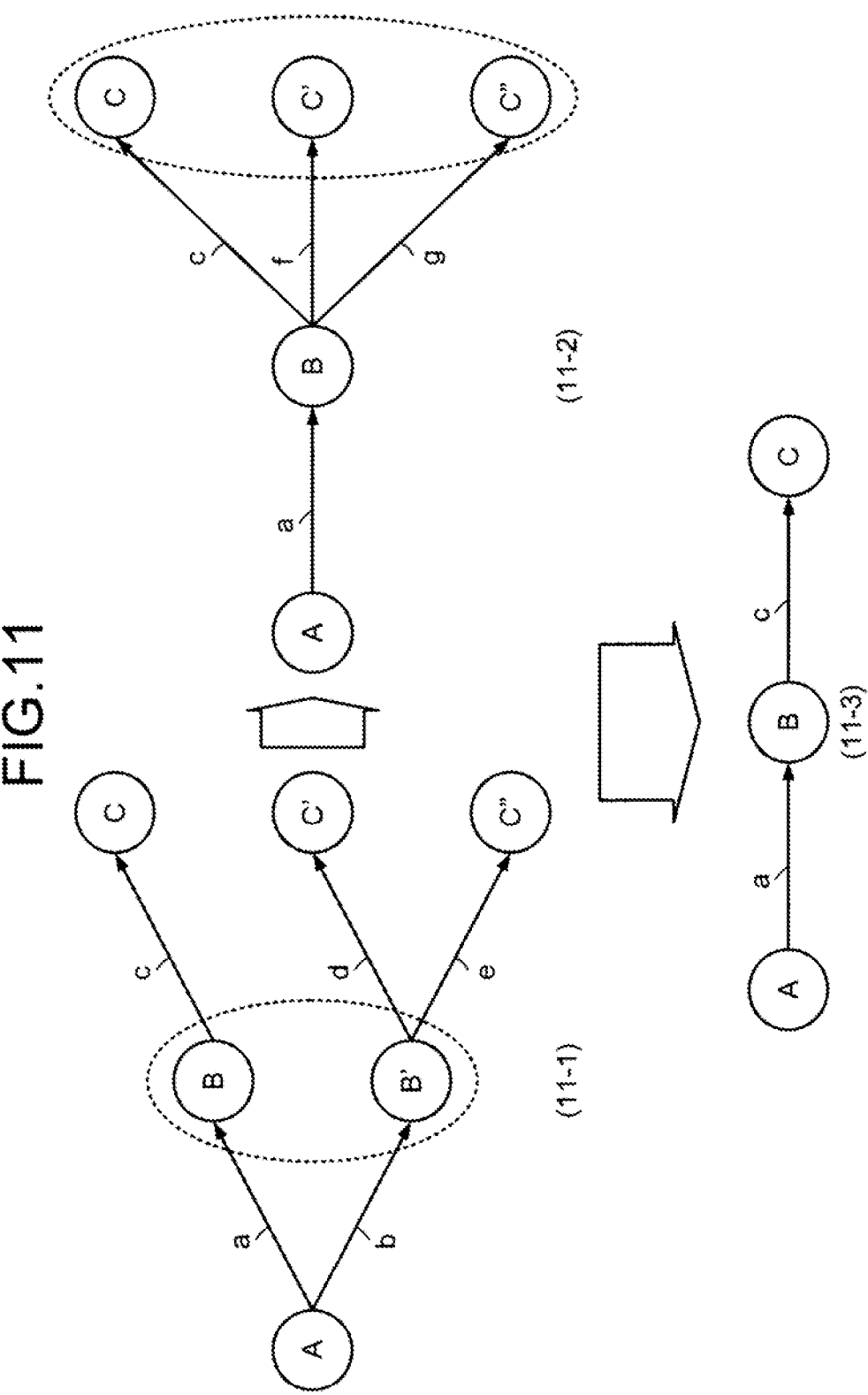
FIG. 11 is an explanatory diagram of a configuration item group connected by "Relationships" (Part I).

FIG. 11 is an explanatory diagram of a configuration item group connected by "Relationships" (Part I). In (11-1) of FIG. 11, configuration items A, B, B', C, C', and C'' are a series of configuration item groups that are connected by multi-stage Relationships".

The configuration item A (source) is connected to the configuration item B (target) by "Relationship a". The configuration item A (source) is connected to the configuration item B' (target) by "Relationship b". The configuration item B (source) is connected to the configuration item C (target) by "Relationship c".

The configuration item B' (source) is connected to the configuration item C' (target) by "Relationship d". The configuration item B' (source) is connected to the configuration item C'' (target) by "Relationship e".

The case is assumed where the configuration items B and B' are same one configuration item. In this case, the configuration item A is selected as the selected configuration item CI i and, as a result, the configuration items B and B' are presented to the manager as the configuration items to be identification candidate. The manager identifies the configuration items B and B' with each other and as a result, CI information records indicating the configuration items B and B' are reconciled.

In (11-2) of FIG. 11, the CI information records indicating the configuration items B and B' are reconciled and the configuration items B and B' are integrated into the one configuration item B.

As a result, the configuration item B (source) is connected to the configuration item C (target) by "Relationship c". The configuration item B (source) is connected to the configuration item C' (target) by "Relationship f". The configuration item B (source) is connected to the configuration item C'' (target) by "Relationship g".

In this case, the case is assumed where the configuration items C, C' and C'' are same one configuration item. In this case, the configuration items B and B' are integrated into the one configuration item B and, as a result, the configuration items C, C', and C'' indicating the same one configuration item are connected to the configuration item B by "Relationships c, f, and g".

When the CI information records indicating the configuration items B and B' are reconciled, the selector 701 may select the CI information records indicating the configuration item B after the reconciliation, from the FCMDB 210 as the target for the determination.

For example, the selector 701 first accepts an identifier of the CI information records acquired after the reconciliation (for example, the item ID of the configuration item B) by an operation input by the user using the display 309 and the keyboard 310 depicted in FIG. 3, or from an external computer. The selector 701 selects the CI information records indicating the configuration item B acquired after the reconciliation, from the FCMDB 210 as the target for the determination. When the information processing apparatus 100 executes the reconciliation for the FCMDB 210, the information processing apparatus 100 is able to detect the identifier of the CI information records acquired after the reconciliation.

As a result, the configuration items C, C', and C'' are presented to the manager as the configuration items to be the identification candidates. When the configuration items C, C', and C'' are identified with each other, as a result, the CI information records indicating the configuration items C, C', and C'' are reconciled.

In (11-3) of FIG. 11, the CI information records indicating the configuration items C, C', and C'' are reconciled and the configuration items C, C', and C'' are integrated into the one configuration item C. As a result, the configuration item B (source) is connected to the configuration item C (target) by "Relationship c".

In this manner, the CI information records acquired after the reconciliation is selected as the target for the determination and thereby, the new configuration item to be the identification candidate is able to be identified, that appears due to the integration of the configuration items in a part of the configuration item group connected by the multi-stage "Relationships".

Hereinafter, the description will be made taking an example of the CI information records 410-1 to 410-n stored on the FCMDB 210 as the CI information records that are the target for the determination.

Figure 12:
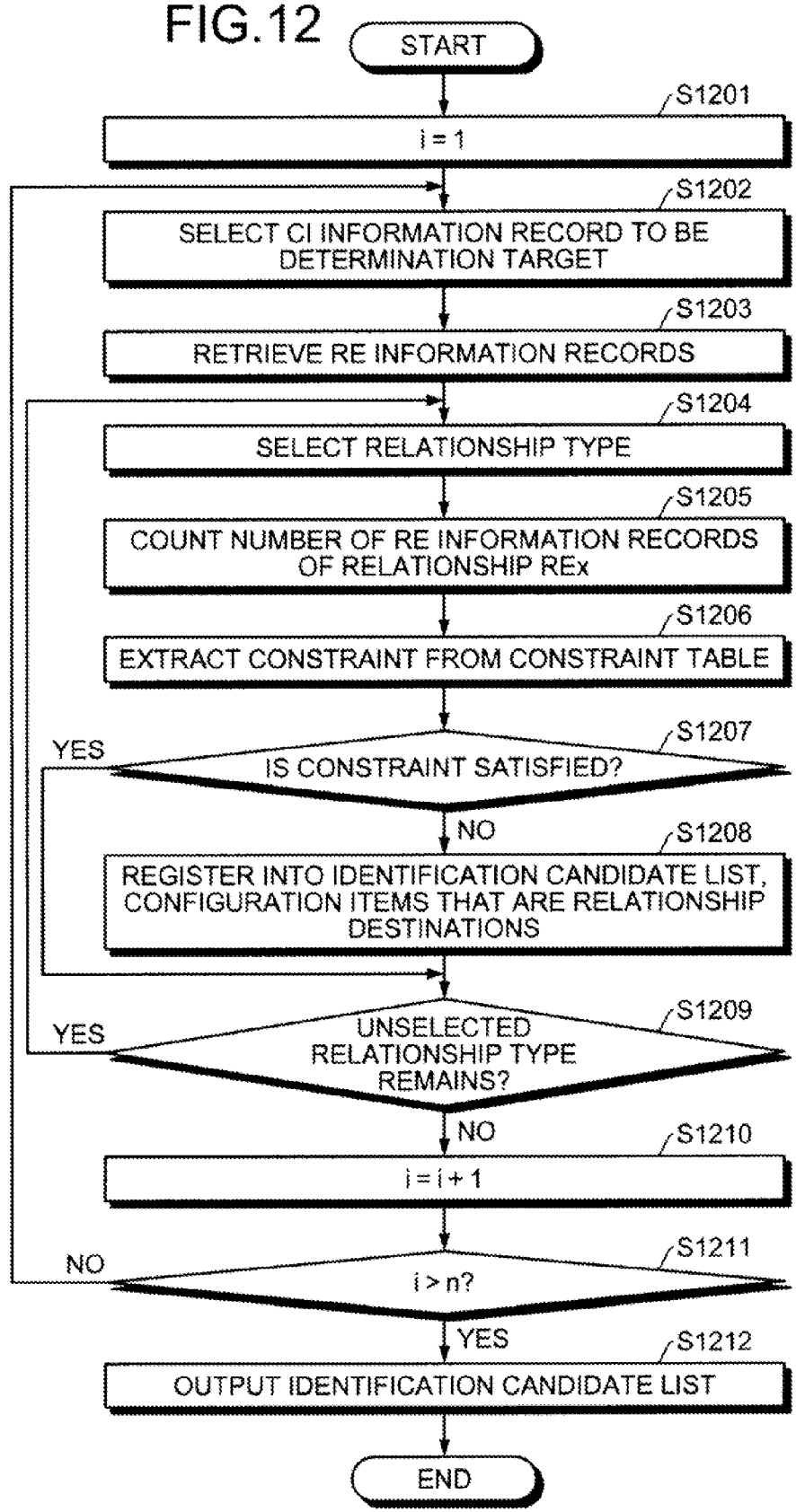
FIG. 12 is a flowchart of an example of a procedure for information processing by the information processing apparatus according to the first embodiment.

FIG. 12 is a flowchart of an example of a procedure for information processing by the information processing apparatus according to the first embodiment. In the flowchart of FIG. 12, the selector 701 first sets "i" to be "i=1" (step S1201) and selects the CI information records 410-i that is the target for the determination from the FCMDB 210 (step S1202).

The counter 702 retrieves from the FCMDB 210 the RE information records that indicates "Relationship" between the selected configuration item CI i and the configuration item that is the relationship destination (step S1203). The counter 702 selects an arbitrary relationship type from the relationship types among the RE information records retrieved (step S1204).

Thereafter, the counter 702 counts the number Nx of the RE information records of "Relationship REx" of the relationship type selected (step S1205). The determiner 703 extracts from the constraint table 600 the constraint that corresponds to the combination of the element type of the selected configuration items CI i and "Relationship REx" (step S1206).

The determiner 703 determines whether the number Nx counted of the RE information records of "Relationship REx" satisfies the constraint extracted (step S1207). At this step, when the determiner 703 determines that the number Nx satisfies the constraint (step S1207: YES), the procedure advances to step S1209.

On the other hand, when the determiner 703 determines that the number Nx does not satisfy the constraint (step S1207: NO), the determiner 703 registers the configuration item that is the relationship destination having "Relationship REx" with the selected configuration item CI i, in the identification candidate list (step S1208). The "identification candidate list" is, for example, the identification candidate list 800 depicted in FIG. 8.

The counter 702 determines whether any unselected relationship type is present that is not selected from the relationship types among the RE information records retrieved (step S1209). At this step, when the unselected relationship type is present (step S1209: YES), the procedure returns to step S1204.

On the other hand, when no unselected relationship type is present (step S1209: NO), the selector 701 increments "i" (step S1210) and determines whether "i" is larger than "n" (step S1211). At this step, when the selector 701 determines that "i" is equal to or smaller than "n" (step S1211: NO), the procedure returns to step S1202.

On the other hand, when the selector 701 determines that "i" is larger than "n" (step S1211: YES), the output unit 704 outputs the identification candidate list (step S1212) and the series of process steps according to the flowchart come to an end.

Thereby, the identification candidate list depicting the configuration items to be the identification candidates of the configuration items CI 1 to CI n is able to be presented to the manager, etc., of the FCMDB system 200.

According to the information processing apparatus 100 according to the first embodiment above, the determination is enabled as to whether the number of REs of "Relationships REs" connected to the selected configuration item CI i satisfies the constraint. Thereby, the configuration item is able to be identified that is connected by many "Relationships REx" whose number exceeds the number of REs stipulated by the constraint.

According to the information processing apparatus 100, the set of the configuration items that are the relationship destinations having "Relationships REs" with the selected configuration element CI i that does not satisfy the constraint, is able to be presented as the configuration items to be the identification candidates. Thereby, identification is facilitated of the CI information records to be reconciled, of the CI information records 410-1 to 410-n in the FCMDB 210.

As a result, the manager of the FCMDB system 200 is able to easily find the configuration items to be identified with each other. The manager of the FCMDB system 200 is able to know that the CI information records to originally be reconciled are not yet reconciled and, therefore, is able to notice the mistake made in setting the IProp.

In the first embodiment, the case is described where the constraints are in advance registered in the constraint table 600 depicted in FIG. 6. However, in a second embodiment, the case will be described where constraints to be registered in the constraint table 600 are generated. The content same as the content described in the first embodiment will not again be described.

Figures 13, 14:
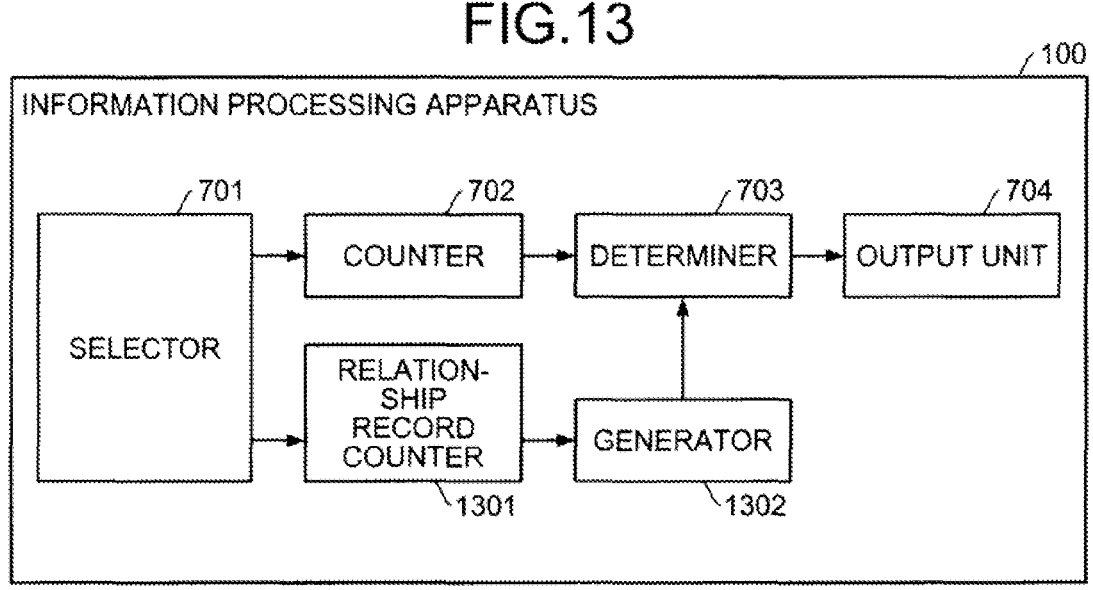
FIG. 13 is a block diagram of a functional configuration of the information processing apparatus according to a second embodiment.
FIG. 14 is an explanatory diagram of an example of the storage content of a history information table (Part I).

FIG. 13 is a block diagram of a functional configuration of the information processing apparatus according to the second embodiment. In FIG. 13, the information processing apparatus 100 includes the selector 701, the counter 702, the determiner 703, the output unit 704, a relationship record counter 1301, and a generator 1302. For example, the functional units (the selector 701 to the output unit 704, the relationship record counter 1301, and the generator 1302) realize their functions, for example, by causing the CPU 301 to execute programs stored in the storing apparatus such as the ROM 302, the RAM 303, the magnetic disk 305, or the optical disk 307, or by the I/F 308.

The content of the processing of the functional units according to a generating process of constraints to be registered in the constraint table 600 will be described.

The selector 701 selects the CI information records 410-i that is the target for the determination, from the CI information records 410-1 to 410-n stored in the FCMDB 210. Another database that virtually integrates plural types of databases such as the FCMDB 210 may be used as the database that is the selection origin for selecting the target for the processing.

The relationship record counter 1301 counts the number of RE information records each indicating "Relationship" between the configuration item CI i indicated by the CI information records 410-i selected and another configuration item.

For example, the relationship record counter 1301 retrieves from the FCMDB 210 the RE information records whose item ID of the configuration item CI i is set to be "sourceItem" or "targetItem" of the RE information records. Thereafter, the relationship record counter 1301 classifies the RE information records retrieved for each relationship type of "Relationship", and counts the number of RE information records classified for each relationship type of "relationship".

The counting result counted is, for example, reflected on a history information table 1400 depicted in FIG. 14. The history information table 1400 is realized by, for example, the storing apparatus such as the RAM 303, the magnetic disk 305, or the optical disk 307. A specific example of the history information table 1400 will be described.

FIG. 14 is an explanatory diagram of an example of the storage content of the history information table (Part I). In FIG. 14, the history information table 1400 has fields that are a "CI type", an "RE type", and a "number of appearances by the number of REs" fields. By setting information in each of the fields, history information for a combination of the CI type and the RE type (for example, history records 1400-1 to 1400-5) are stored therein as a record.

The "CI type" refers to an element type of the configuration item. The "RE type" refers to a relationship type of the relationship between configuration items. The "number of appearances by the number of REs" refers to the number of appearances of the counting result that corresponds to a combination of a CI type and an RE type. The "number of REs" represents the number of configuration items each having "Relationship" of the relationship type with the configuration item of the CI type. The initial value of the number of appearances by the number of REs is "zero".

Taking an example of the history records 1400-1, this history records 1400-1 indicates that a counting result appears for "10" times, each depicting that the number of the RE information records is "one" that indicates "Relationship" of the relationship type "OwnedBy" between a configuration item of the element type "Server" and another configuration item, and also indicates that another counting result appears for "one" time, depicting that the number of the RE information records is "two" that each indicate "Relationship" of the relationship type "OwnedBy" between a configuration item of the element type "Server" and another configuration item.

Taking an example of the history records 1400-5, this history records 1400-5 indicates: that a counting result appears for "six" times, each depicting that the number of the RE information records is "one" that indicates "Relationship" of the relationship type "Purchased" between a configuration item of the element type "Rack" and another configuration item; also indicates that a counting result appears for "two" times, each depicting that the number of the RE information records is "two" that each indicate "Relationship" of the relationship type "Purchased" between a configuration item of the element type "Rack" and another configuration item; and further indicates that a counting result appears for "three" times, each depicting that the number of the RE information records is "three" that each indicates "Relationship" of the relationship type "Purchased" between a configuration item of the element type "Rack" and another configuration item.

It is assumed that, for example, the relationship record counter 1301 counts the number "one" of the RE information records that indicates "Relationship" of the relationship type "OwnedBy" between the configuration item CI i of the element type "Server" and another configuration item. In this case, the number of appearances is incremented that is set in the field of the number of appearances by the number of REs "one" of the history records 1400-1.

It is also assumed that, for example, the relationship record counter 1301 counts the number "three" of the RE information records that each indicate "Relationship" of the relationship type "Purchased" between the configuration item CI i of the element type "Rack" and another configuration item. In this case, the number of appearances is incremented that is set in the field of the number of appearances by the number of REs "three" of the history records 1400-5.

Returning back to the description with reference to FIG. 13, the generator 1302 generates a constraint that stipulates the number of configuration items that are the relationship destinations each having "Relationship" of a relationship type with a configuration item of an element type for each combination of the element type of the configuration item and the relationship type of "Relationship". For example, the generator 1302 refers to the history information table 1400 depicted in FIG. 14 and generates the constraint for each combination of an element type of a configuration item and a relationship type of "Relationship" between the configuration items.

The constraint generated is stored in, for example, the constraint table 600 depicted in FIG. 6. The specific content of the processing of the generator 1302 will later be described.

The determiner 703 determines whether the number Nx of the RE information records of "Relationship" REx counted by the counter 702 satisfies the constraint generated. This constraint stipulates the number of configuration items that are the relationship destinations each having "Relationship REx" with a configuration item of the element type same as the element type of the selected configuration item IC i, of the constraints generated by the generator 1302.

For example, the determiner 703 extracts the constraint whose CI type is set to be "the element type of the selected configuration item CI i" and whose RE type is set to be "the relationship type of "Relationship REx"", from the constraint table 600. The determiner 703 determines, for example, whether the number Nx counted of the RE information records of "Relationship REx" is equal to or smaller than the number of REs stipulated by the constraint extracted.

The specific content of the processing of the generator 1302 will be described. The generator 1302 first selects arbitrary history information (hereinafter, "history records 1400-$k$") from the history information table 1400 (k: 1, 2, . . . ). The generator 1302 calculates a total number of appearances by totaling the numbers of appearances by the number of REs of the history records 1400-$k$, and identifies the largest number of appearances (hereinafter, "largest appearance number") of the numbers of appearances for each number of REs of the history records 1400-$k$.

The generator 1302 calculates the appearance rate of the largest appearance number by dividing the largest appearance number identified by the total number of appearances and, thereafter, determines whether the appearance rate of the largest appearance number calculated is greater than or equal to a predetermined threshold value $\alpha$. The threshold value $\alpha$, for example, is set in advance and is stored in the storing apparatus such as the RAM 303, the magnetic disk 305, or the optical disk 307.

When the generator 1302 determines that the appearance rate of the largest appearance number is greater than or equal to the predetermined threshold value $\alpha$, the generator 1302 generates a constraint that stipulates the number of REs of the largest appearance number is the upper limit value of the number of configuration items that are the relationship destinations each having "Relationship" of the RE type with the configuration item of the CI type of the history records 1400-$k$. When the generator 1302 determines that the appearance rate of the largest appearance number is smaller than the predetermined threshold value $\alpha$, the generator 1302 generates no constraint.

In the whole counting results acquired by counting the number of REs of "Relationship RE" between the configuration items, when the numbers of REs of "Relationship REx" between the configuration items coincide with each other at a rate or higher, this case of coincidence is employed as a rule. Thereby, the constraint is able to be generated based on the relationship property among the configuration items registered on the FCMDB 210.

When the total number of appearance acquired by totaling the numbers of appearances by the number of REs of the history records 1400-$k$ is greater than or equal to a predetermined threshold value $\beta$, the generator 1302 may calculate the appearance rate of the largest appearance number and determine whether this appearance rate is greater than or equal to the threshold value $\beta$.

The generator 1302 generates the constraint based on the counting results acquired by counting the numbers of REs of "Relationship RE" between the configuration items. Thereby, the generator 1302 is able to generate the constraint that is more suitable for the operation of the IT system 220. The threshold value $\beta$ (for example, 100), for example, is set in advance and is stored in the storing apparatus such as the RAM 303, the magnetic disk 305, or the optical disk 307.

When the total number of appearances is greater than or equal to the threshold value $\beta$, the generator 1302 may generate a constraint that stipulates that the number of REs of the largest appearance number is the upper limit value of the number of configuration items that are the relationship destinations. Thereby, in the whole counting results acquired by counting the numbers of REs of "Relationship RE" between the configuration items, the number of REs appearing for the most times is able to be employed as a rule.

The generator 1302 may calculate the appearance rate for each number of REs by dividing the number of appearances for each number of REs of the history records 1400-$k$ by the total number of appearances. In this case, the generator 1302 determines whether the appearance rate calculated of the number of appearances for each number of REs is greater than or equal to the threshold value $\alpha$. The generator 1302 may generate a constraint that stipulates that the number of REs whose appearance rate is greater than or equal to the threshold value $\alpha$ is the upper limit value of the number of configuration items that are the relationship destinations each having "Relationship" of the RE type with the configuration item of the CI type of the history records 1400-$k$.

Thereby, the generator 1302 is able to generate one or more constraint(s) for one combination of the CI type and the RE type, and is able to cope with the case where a plurality of numbers are present as the number of configuration items that are the relationship destinations connected by "Relationships".

Exemplary production of a constraint will be described taking the case as an example where the history records 1400-1 is selected from the history information table 1400. In this case, the threshold value α is assumed to be "α=0.8". To simplify the description, the production will be described taking examples of the cases where the number is "one" of RE(s) of the number of appearances by the number of REs in the history information table 1400, where the number thereof is "two", and where the number thereof is "three".

The generator 1302 calculates the total number of appearances "11 (=10+1+0)" by totaling the numbers of appearances by the number of REs (one: 10, two: one, and three: zero) of the history records 1400-1, and identifies the largest appearance number of the numbers of appearances for the numbers of REs of the history information 1400. In this case, the number "10" of appearances for the number of RE of "one" is identified as the largest appearance number.

The generator 1302 calculates the appearance rate "0.9≈10/11" of the largest appearance number by dividing the largest appearance number "10" by the total number of appearances "11" and, thereafter, determines whether the appearance rate "0.9" of the largest appearance number is greater than or equal to the threshold value α. In this case, α is "α=0.8" and, therefore, the appearance rate "0.9" of the largest appearance number is greater than or equal to the threshold value α.

In this case, the generator 1302 generates a constraint that stipulates that the number of the RE "one" of the largest appearance number "10" is the upper limit value of the number of configuration items that are the relationship destinations each having "Relationship" of the RE type "OwnedBy" with the configuration items of the CI type "Server" of the history records 1400-1.

A procedure for a condition generating process by the information processing apparatus 100 according to the second embodiment will be described. In the description below, the history information records stored in the history information table 1400 will be denoted by "history records 1400-1 to 1400-K".

Figure 15:
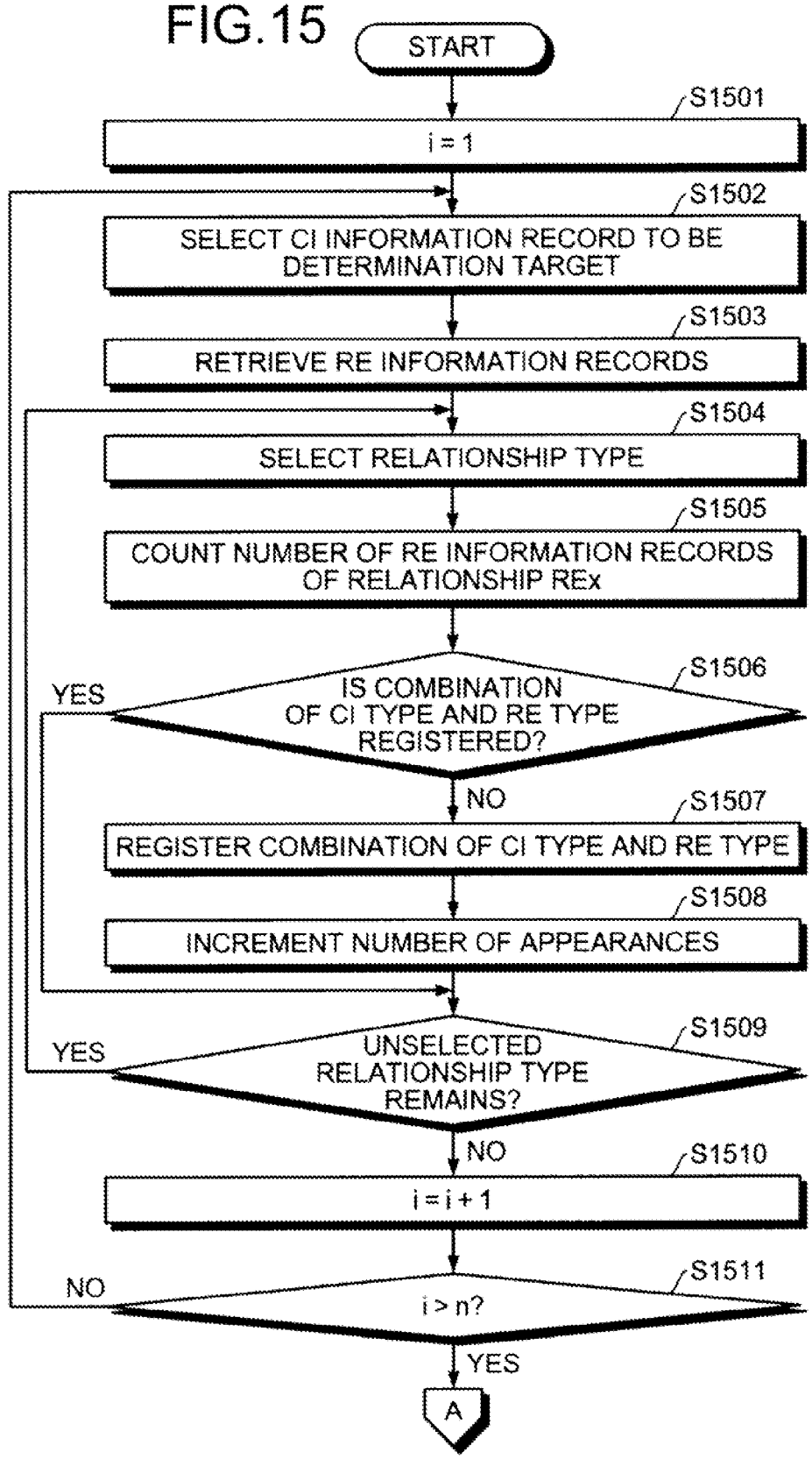
FIGS. 15 and 16 are flowcharts of an example of a procedure for a condition generating process by the information processing apparatus according to the second embodiment.
Figure 16:
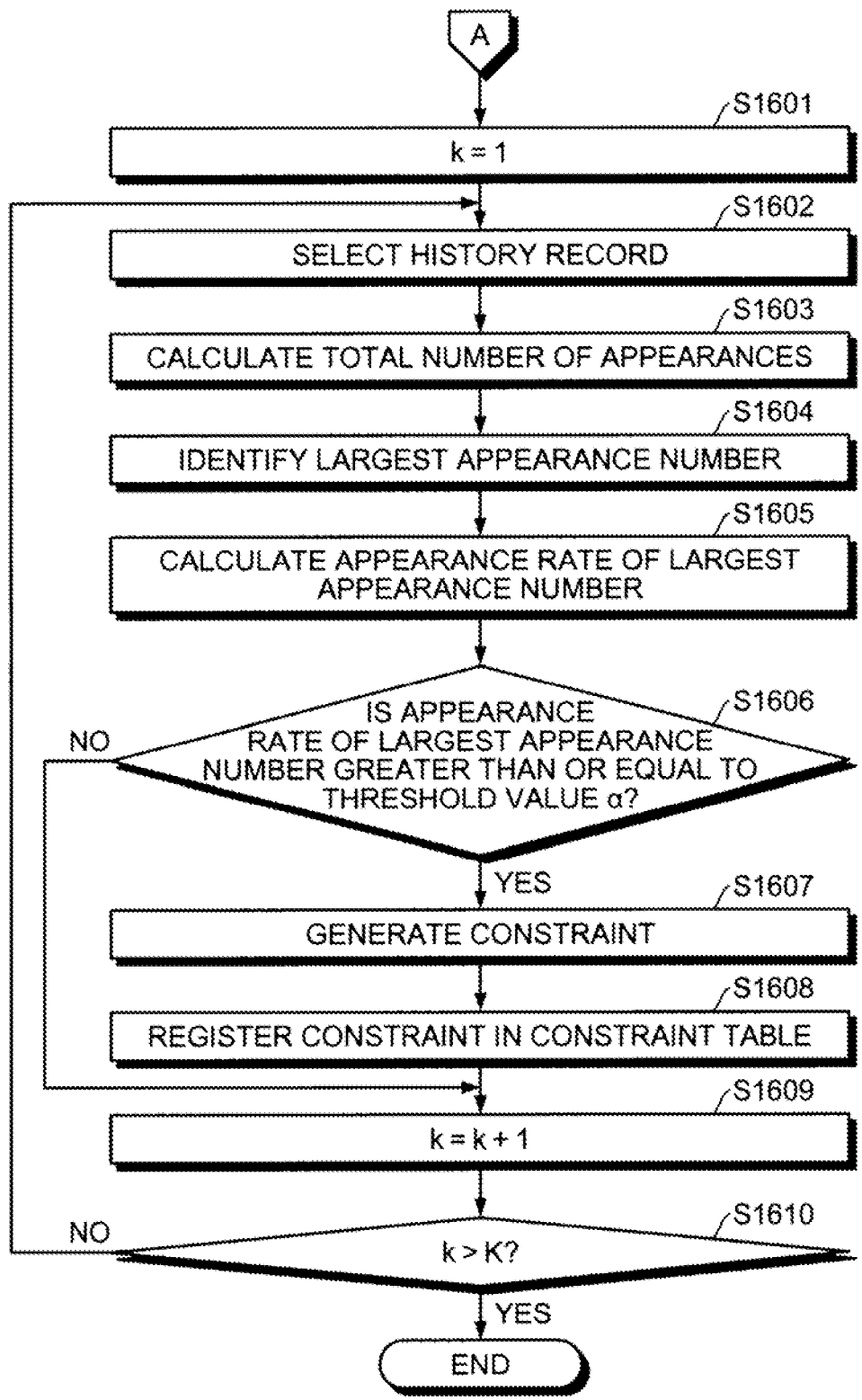

FIGS. 15 and 16 are flowcharts of an example of the procedure for the condition generating process by the information processing apparatus according to the second embodiment. In the flowchart of FIG. 15, the selector 701 first sets "i" to be "i=1" (step S1501) and selects the CI information records 410-*i* to be processed from the FCMDB 210 (step S1502).

The relationship record counter 1301 retrieves RE information records that each indicate "Relationship" between the configuration item CI i indicated by the CI information records 410-*i* selected and another configuration item (step S1503), selects an arbitrary relationship type from the relationship types of the RE information records retrieved (step S1504), and, thereafter, counts the number of RE information records of "Relationship REx" of the relationship type selected, of the RE information records retrieved (step S1505).

The relationship record counter 1301 determines whether any combination of the CI type and the RE type is registered in the history information table 1400 (step S1506). The "CI type" is the element type of the configuration item CI i indicated by the CI information records 410-*i* selected. The "RE type" is the relationship type of "Relationship REx" selected.

When the relationship record counter 1301 determines that a combination of the CI type and the RE type is registered (step S1506: YES), the procedure advances to step S1508. On the other hand, when the relationship record counter 1301 determines that no combination of the CI type and the RE type is registered yet (step S1506: NO), the relationship record counter 1301 registers a combination of the CI type and the RE type in the history information table 1400 (step S1507). As a result, a new record concerning the combination of the CI type and the RE type registered is generated in the history information table 1400.

The relationship record counter 1301 increments the number of appearances of the number of appearances by the number of REs in the history information table 1400, that corresponds to the number counted of RE information records of the "Relationship REx" (step S1508) and determines whether any unselected relationship type is present that is not selected from the relationship types among the RE information records retrieved (step S1509).

When the relationship record counter 1301 determines that the unselected relationship type is present (step S1509: YES), the procedure returns to step S1504. On the other hand, when the relationship record counter 1301 determines that no unselected relationship type is present (step S1509: NO), the selector 701 increments "i" (step S1510) and determines whether "i" is larger than "n" (step S1511).

When the selector 701 determines that "i" is equal to or smaller than "n" (step S1511: NO), the procedure returns to step S1502. On the other hand, when the selector 701 determines that "i" is larger than "n" (step S1511: YES), the procedure advances to step S1601 depicted in FIG. 16.

In the flowchart of FIG. 16, the generator 1302 sets "k" to be "k=1" (step S1601) and selects the history records 1400-*k* from the history information table 1400 (step S1602). The generator 1302 calculates the total number of appearances by totaling the numbers of appearances by the number of REs of the history records 1400-*k* (step S1603).

The generator 1302 identifies the largest appearance number of the numbers of appearances for the numbers of REs of the history records 1400-*k* (step S1604) and calculates the appearance rate of the largest appearance number by dividing the largest appearance number identified, by the total number of appearances (step S1605).

Thereafter, the generator 1302 determines whether the appearance rate calculated of the largest appearance number is greater than or equal to the threshold value α (step S1606). When the generator 1302 determines that the appearance rate of the largest appearance number is smaller than the threshold value α (step S1606: NO), the procedure advances to step S1609.

On the other hand, when the generator 1302 determines that the appearance rate of the largest appearance number is greater than or equal to the threshold value α (step S1606: YES), the generator 1302 generates a constraint that stipulates that the number of REs of the largest appearance number is the upper limit value of the number of configuration items that are the relationship destinations (step S1607). The configuration items that are the relationship destinations are the configuration items that each have "Relationship" of the RE type with the configuration item of the CI type of the history records 1400-*k*.

The generator 1302 registers the constraint generated, in the constraint table 600 (step S1608), increments "k" (step S1609), and determines whether "k" is larger than "K" (step S1610).

When the generator 1302 determines that "k" is equal to or smaller than "K" (step S1610: NO), the procedure returns to step S1602. On the other hand, when the generator 1302 determines that "k" is larger than "K"(step S1610: YES), the series of process steps according to the flowchart comes to an end.

Thereby, the constraint is able to be generated, that stipulates the number of configuration items that are the relationship destinations each connected by "Relationship" of an RE type to the configuration item of a CI type for each combination of the CI type and the RE type.

According to the information processing apparatus 100 according to the second embodiment, the constraints are able to be generated by employing the cases where the numbers of REs of the "Relationship REx" coincide with each other at a specific rate or high in the whole counting results acquired by counting the number of REs of the "Relationship RE" between the configuration items. Thereby, the constraints are able to be generated based on the relationship property among the configuration items registered on the FCMDB 210.

In a third embodiment, the case will be described where the degree of the possibility is expressed using a score, that a set of the configuration items that are the relationship destinations each having the "Relationship REx" with the selected configuration item CI i that does not satisfy the constraint, includes one same configuration item.

Figure 17:
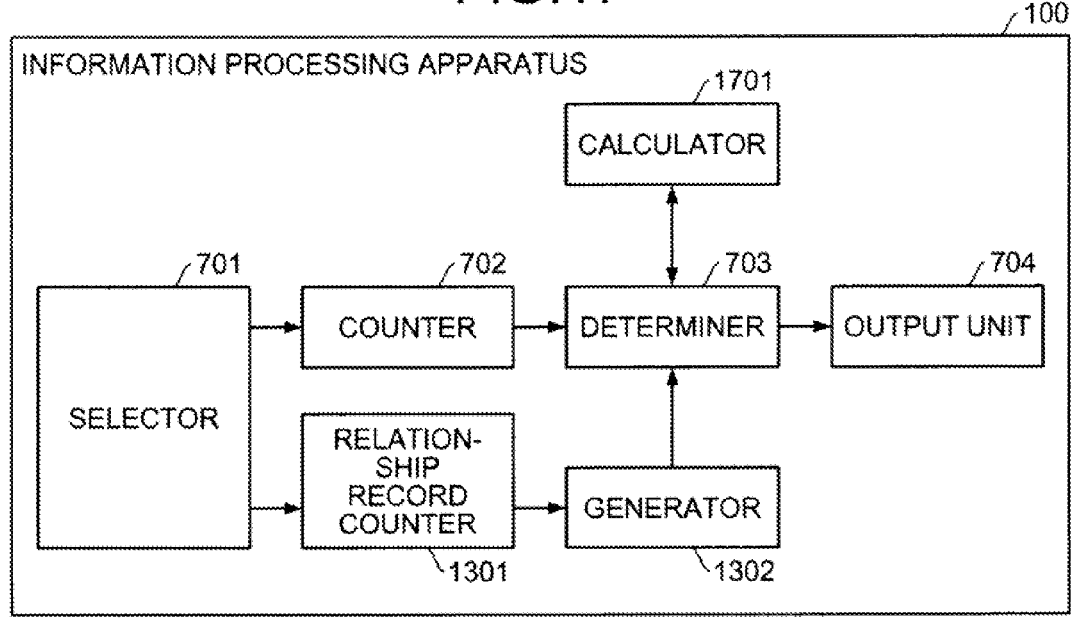
FIG. 17 is a block diagram of a functional configuration of the information processing apparatus according to a third embodiment.

FIG. 17 is a block diagram of a functional configuration of the information processing apparatus according to the third embodiment. In FIG. 17, the information processing apparatus 100 includes the selector 701, the counter 702, the determiner 703, the output unit 704, the relationship record counter 1301, the generator 1302, and a calculator 1701. For example, the functional units (the selector 701 to the output unit 704, the relationship record counter 1301, the generator 1302, and the calculator 1701) realize their functions, for example, by causing the CPU 301 to execute programs stored in the storing apparatus such as the ROM 302, the RAM 303, the magnetic disk 305, or the optical disk 307, or by the I/F 308 that are depicted in FIG. 3.

The calculator 1701 calculates an index value (hereinafter, "score Si") that indicates the probability that a set of the configuration items that are the relationship destinations each having the "Relationship REx" with the selected configuration item CI i that is determined by the determiner 703 not to satisfy the constraint, includes one same configuration element.

For example, the calculator 1701 calculates the score Si based on the number Nx counted of RE information records each indicating the "Relationship REx", and the appearance rate of the number of RE information records each indicating the "Relationship REx" stipulated in the constraint as the number of configuration items that are the relationship destinations.

For example, the calculator 1701 calculates the score Si by multiplying the number of RE information records each indicating the "Relationship REx", by the appearance rate of the largest appearance number stipulated in the constraint as the number of configuration items that are the relationship destinations. The specific content of the processing of the calculator 1701 will later be described with reference to FIGS. 18 and 19.

The determiner 703 determines whether the score Si calculated is greater than or equal to a threshold value γ. When the determiner 703 determines that the score Si is greater than or equal to the threshold value γ, this indicates that the set of configuration items that are the relationship destinations each having the "Relationship REx" with the selected configuration item CI i that does not satisfy the constraint, is highly likely to include one same configuration item. The threshold value γ, for example, is set in advance and is stored in the storing apparatus such as the ROM 302, the RAM 303, the magnetic disk 305, or the optical disk 307.

When the determiner 703 determines that the score Si is greater than or equal to the threshold value γ, the output unit 704 may output an identification candidate list that depicts the configuration items that are the relationship destinations each having the "Relationship REx" with the selected configuration item CI i that does not satisfy the constraint. Thereby, when the score Si is greater than or equal to the threshold value γ, the configuration items that are the destination destinations each having the "Relationship REx" with the selected configuration item CI i that does not satisfy the constraint, are able to be presented as the configuration items to be identification candidates.

When the output unit 704 collectively outputs the determination results of the plurality of selected configuration items that do not satisfy the constraint, the output unit 704 may output the identification candidate list depicting in order of descending score the configuration items that are the relationship destinations each having the "Relationship REx" with the selected configuration item. Thereby, the manager of the FCMDB system 200 is able to execute the identification work for a configuration item group in order of descending possibility that the group includes the same one configuration item.

The specific content of the processing of the calculator 1701 will be described with reference to FIGS. 18 and 19.

Figure 18:
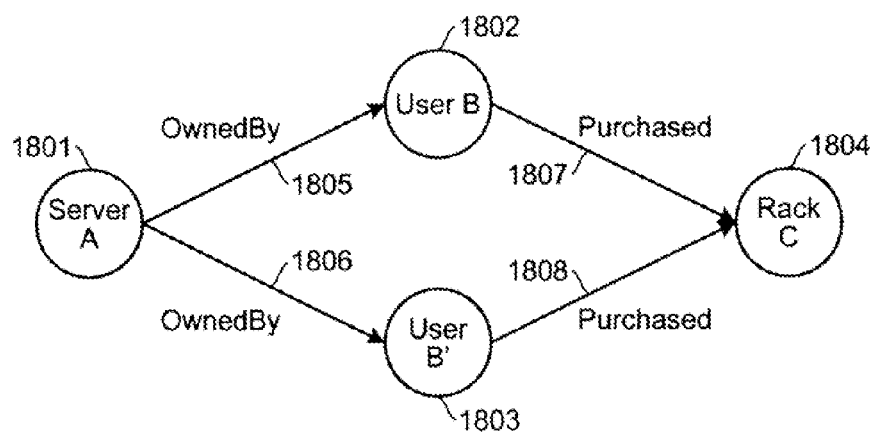
FIG. 18 is an explanatory diagram of a configuration item group connected by "Relationships" (Part II).

FIG. 18 is an explanatory diagram of a configuration item group connected by "Relationships" (Part II). In FIG. 18, configuration items 1801 to 1804 are a series of configuration item groups connected by multi-stage relationships.

For example, the configuration item 1801 (item ID: ServerA) is connected to the configuration item 1802 (item ID: UserB) by "Relationship" 1805 of "OwnedBy", and is also connected to the configuration item 1803 (item ID: UserB') by "Relationship" 1806 of "OwnedBy".

The configuration item 1802 (item ID: UserB) is connected to the configuration item 1804 (item ID: RackC) by "Relationship" 1807 of "Purchased", and the configuration item 1803 (item ID: UserB') is connected to the configuration item 1804 (item ID: RackC) by "Relationship" 1808 of "Purchased".

FIG. 19 is an explanatory diagram of an example of the storage content of the history information table (Part II). In FIG. 19, a history information table 1900 has a "CI type", an "RE type", a "number of appearances by the number of REs", and a "degree of accuracy" fields. History information (for example, history information 1900-1 to 1900-5) each for a combination of a CI type and an RE type are stored as records by setting information in each field.

The "CI type" refers to an element type of a configuration item. The "RE type" refers to a relationship type of "Relationship" between configuration items. The "number of appearances by the number of REs" refers to the number of appearances of a counting result that corresponds to the combination of a CI type and an RE type. The "degree of accuracy" refers to an index value that indicates the degree of likelihood of a constraint generated based on each history information record.

In the example, the appearance rate of the largest appearance number acquired by dividing the largest appearance number of each history information by the total appearance number thereof, is set to be the degree of accuracy. The degree of accuracy of each history information record is, for example, updated each time a constraint is generated.

However, the degree of accuracy of each history information record may arbitrarily be set by an operation input of the user using the keyboard 310 and the mouse 311 depicted in FIG. 3. For example, when the manager of the FCMDB system 200 manually sets a constraint, the manager may set the degree of accuracy corresponding to a combination of the CI type and the RE type of the constraint, to be "one".

It is assumed that the selected configuration item CI i is the "configuration item 1801" and the relationship type of the "Relationship Rx" is "OwnedBy". The description will be made taking an example of the case where it is determined that the configuration item 1801 does not satisfy the constraint 600-1 (see FIG. 6) because the number is "two" of RE information records that each indicate the "Relationship REx" of "OwnedBy", counted by the counter 702. However, it is assumed that the constraint 600-1 is generated based on the history information 1900-1.

In this case, the calculator 1701 first refers to the history information table 1900, identifies a degree of accuracy "10/11" that corresponds to the combination of the CI type and the RE type of the constraint 600-1, and calculates the score Si by multiplying the number "two" of RE information records each indicating the "Relationship REx" counted by the counter 702, by the degree of accuracy "10/11" identified. In this case, "20/11 (=2×10/11)" is calculated as the score Si.

The determiner 703 determines whether the score Si calculated is greater than or equal to the threshold value γ. Assuming that the threshold value γ is "γ=3", the determiner 703 determines that the score Si calculated is smaller than the threshold value γ.

In this case, the output unit 704 may determine not to output the determination result that determines that the selected configuration item CI i does not satisfy the constraint. The possibility is low that the set of the configuration items that are the relationship destinations each having the "Relationship REx" with the selected configuration item CI i includes the same one configuration item and, therefore, the configuration items to be the identification candidates are not presented.

In the above, only the selected configuration item CI i is noted, that is determined not to satisfy the constraint as the score Si of the selected configuration item CI i. However, the score is not limited to the above. For example, the calculator 1701 may calculate the score Si of the selected configuration item CI i noting the series of configuration item/"Relationship" groups that receive an influence when the configuration items are collected up that are the relationship destinations of the selected configuration item CI i that is determined not to satisfy the constraint.

The content will be described with reference to FIG. 18, of a process to retrieve the series of configuration item/"Relationship" groups that receive an influence when the configuration items are collected up that are the relationship destinations of the selected configuration item CI i that is determined not to satisfy the constraint.

The calculator 1701 retrieves from the FCMDB 210 configuration items 1802 and 1803 connected by the "Relationships" 1805 and 1806 with the configuration item 1801 that is determined not to satisfy the constraint 600-1. The relationship type "OwnedBy" of the "Relationships" 1805 and 1806 is the RE type that corresponds to the constraint 600-1.

The calculator 1701 retrieves from the FCMDB 210 the "Relationships" whose item ID of the configuration items 1802 and 1803 is set to be "sourceItem" or "targetItem" (except the "Relationships" 1805 and 1806). In this case, the "Relationships" 1807 and 1808 are retrieved.

The calculator 1701 retrieves from the FCMDB 210 the configuration items each connected to the configuration items 1802 and 1803 by the "Relationship" 1807 and 1808. In this case, the configuration item 1804 is retrieved.

The calculator 1701 retrieves from the FCMDB 210 the "Relationships" whose item ID of the configuration items 1804 is set to be "sourceItem" or "targetItem" (except the "Relationships" 1807 and 1808). In this case, no relationship is retrieved because no configuration item is present that is connected to the configuration item 1804 and that is different from the configuration items 1802 and 1803.

Thereby, the series of configuration item/"Relationship" groups 1801 to 1808 are able to be retrieved that receive the influence when the configuration items 1802 and 1803 are collected up that are the relationship destinations of the configuration item 1801 that is determined not to satisfy the constraint 600-1.

In this case, the calculator 1701 identifies combinations each of the CI type (Source) and the RE type that are included in the series of configuration item/"Relationship" groups 1801 to 1808 retrieved. In this case, a combination P1 of the CI type "Server" and the RE type "OwnedBy" and a combination P2 of the CI type "User" and the RE type "Purchased" are identified.

The calculator 1701 refers to the history information table 1900 and identifies the degree of accuracy that corresponds to each combination for each of the combinations identified. In this case, the degree of accuracy "10/11" corresponding to the combination P1 and the degree of accuracy "10/12" corresponding to the combination P2 are identified.

The calculator 1701 counts the number of "Relationships" that each correspond to the combination P1 or P2, among the configuration item/"Relationship" group 1801 to 1808. In this case, "two" is counted as the number of "Relationships" each corresponding to the combination P1 and "two" is counted as the number of "Relationships" each corresponding to the combination P2.

The calculator 1701 calculates a value "20/11" that is acquired by multiplying the degree of accuracy "10/11" that corresponds to the combination P1 by the number "two" of the "Relationships" that each correspond to the combination P1, and calculates a value "20/12" that is acquired by multiplying the degree of accuracy "10/12" that corresponds to the combination P2 by the number "two" of the "Relationships" that each correspond to the combination P2.

The calculator 1701 calculates a score "3.485" of the configuration item 1801 by summing up the value "20/11≈1.818" of the combination P1 and the value "20/12≈1.667" of the combination P2. In this case, the determiner 703 determines whether the score "3.485" calculated of the configuration item 1801 is greater than or equal to the threshold value γ. Assuming that the threshold value γ is "γ=3" in this case, the determiner 703 determines that the score calculated of the configuration item 1801 is greater than or equal to the threshold value γ.

Thereby, the similarity among the configuration items in the range that causes reception of the influence when the configuration items are collected up that are the relationship destinations of the selected configuration item CI i determined not to satisfy the constraint, is able to be reflected on the score Si of the selected configuration item CI i.

A procedure for information processing by the information processing apparatus 100 according to the third embodiment will be described. The description will be made taking an example of the case where only the selected configuration item CI i is noted that is determined not to satisfy the constraint, as the score Si of the elected configuration item CI i.

FIG. 20 is a flowchart of an example of a procedure for information processing by the information processing apparatus according to the third embodiment. In the flowchart of FIG. 20, the selector 701 first sets "i" to be "i=1" (step S2001) and selects the CI information records 410-i that is the target for the determination from the FCMDB 210 (step S2002).

The counter 702 retrieves from the FCMDB 210, the RE information records having a configuration item that is the relationship origin (step S2003). The counter 702 selects an arbitrary relationship type from the relationship types among the retrieved RE information records (step S2004).

Thereafter, the counter 702 counts the number of the RE information records of "Relationship REx" of the relationship type selected (step S2005). The determiner 703 extracts from the constraint table 600 the constraint that corresponds to the combination of the element type of the selected configuration items CI i and "Relationship REx" (step S2006).

The determiner 703 determines whether the number of the RE information records of "Relationship REx" satisfies the constraint extracted (step S2007). At this step, when the determiner 703 determines that the number satisfies the constraint (step S2007: YES), the procedure advances to step S2012.

On the other hand, when the determiner 703 determines that the number of RE information records does not satisfy the constraint (step S2007: NO), the calculator 1701 refers to the history information table 1900, identifies the degree of accuracy that corresponds to the combination of the CI type and the RE type of the constraint extracted (step S2008), and calculates the score Si by multiplying the number counted of RE information records each indicating the "Relationship REx" by the degree of accuracy identified (step S2009).

The determiner 703 determines whether the score Si calculated is greater than or equal to the threshold value γ (step S2010). When the determiner 703 determines that the score Si is smaller than the threshold value γ (step S2010: NO), the procedure advances to step S2012. On the other hand, when the determiner 703 determines that the score Si is greater than or equal to the threshold value γ (step S2010: YES), the determiner 703 registers in the identification candidate list the configuration items that are the relationship destinations each having the "Relationship REx" with the selected configuration item CI i (step S2011).

The counter 702 determines whether any unselected relationship type is present that is not selected from the relationship types of the RE information records retrieved (step S2012). At this step, when the unselected relationship type is present (step S2012: YES), the procedure returns to step S2004.

On the other hand, when no unselected relationship type is present (step S2012: NO), the selector 701 increments "i" (step S2013) and determines whether "i" is larger than "n" (step S2014). At this step, when the selector 701 determines that "i" is equal to or smaller than "n" (step S2014: NO), the procedure returns to step S2002.

On the other hand, when the selector 701 determines that "i" is larger than "n" (step S2014: YES), the output unit 704 outputs the identification candidate list (step S2015) and the series of process steps according to the flowchart come to an end.

Thereby, the configuration items that are the relationship destinations each having the "Relationship REx" with the selected configuration item whose score Si is greater than or equal to the threshold value γ, of the selected configuration items that do not satisfy the constraint, are able to be presented as the configuration items to be the identification candidates.

According to the information processing apparatus 100 according to the third embodiment, the score Si is able to be calculated that indicates the degree of the possibility that the set of the configuration items that are the relationship destinations each having the "Relationship REx" with the selected configuration item CI i that does not satisfy the constraint, includes one same configuration item. Thereby, the configuration items that are the relationship destinations and that are highly likely to be the same one configuration item are able to be presented as the configuration items to be the identification candidates.

In a fourth embodiment, the case will be described where configuration items highly likely to be one same configuration item are narrowed down from a set of configuration items to be identification candidates.

With reference to FIG. 21, processing of the determiner 703 that narrows down configuration items highly likely to be one same configuration item, from a set of configuration items to be identification candidates.

FIG. 21 is an explanatory diagram of a set of the configuration items to be the identification candidates. In FIG. 21, a configuration item 2101 (item ID: HubA) is a configuration item that is determined not to satisfy the constraint. The configuration item 2101 (item ID: HubA) is connected to a configuration item 2102 (item ID: ServerB1) by "Relationship" 2107 of "ConnectedTo".

Further, the configuration item 2101 (item ID: HubA) is connected to a configuration item 2103 (item ID: ServerB2) by "Relationship" 2108 of "ConnectedTo". The configuration item 2101 (item ID: HubA) is connected to a configuration item 2104 (item ID: ServerB3) by "Relationship" 2109 of "ConnectedTo".

Further, the configuration item 2101 (item ID: HubA) is connected to a configuration item 2105 (item ID: ServerB4) by "Relationship" 2110 of "ConnectedTo". The configuration item 2101 (item ID: HubA) is connected to a configuration item 2106 (item ID: ServerB5) by "Relationship" 2111 of "ConnectedTo".

The constraint not satisfied by the configuration item 2101 stipulates that the number "four" of configuration items that are the relationship destinations each having the "Relationship" of the RE type "ConnectedTo" with the configuration item of the CI type "Hub". Therefore, the configuration items 2102 to 2106 are configuration items to be identification candidates.

The case is assumed where configuration items highly likely to be one same configuration item are narrowed down from the configuration items 2102 to 2106 to be the identification candidates.

The determiner 703 compares attributes with each other of the configuration items of the set of the configuration items to be the identification candidates. For example, the determiner 703 first selects a pair of configuration items (for example, the configuration items 2102 and 2103) from the configuration items 2102 to 2106 to be the identification candidates.

The determiner 703 compares attribute values with each other of the configuration items selected for each of the attributes (for example, the name, the configuring part, and the IP address). The process of selecting the pair of configuration items is repeatedly executed until no unselected pair is present in the configuration items 2102 to 2106 to be the identification candidates. In the example of FIG. 21, the pairs selected of the configuration items are 10 pairs.

Based on the comparison results acquired by the comparisons, the determiner 703 calculates the degree of coincidence among the configuration items to be the identification candidates. For example, the determiner 703 calculates the number of attribute values of an attribute that coincide with each other as the degree of coincidence among the configuration items for each of the configuration items selected. For example, when the number of attribute values of an attribute that coincide with each other is two between the configuration items 2102 and 2103, the degree of coincidence between the configuration items 2102 and 2103 is "two".

Based on the degrees of coincidence calculated among the configuration items, the determiner 703 determines the pair of the configuration items that represents same one configuration item in the set of the configuration items to be the identification candidates. For example, the determiner 703 determines the pair of the configuration items depicting the highest degree of coincidence (for example, the configuration items 2102 and 2103), as the pair that represents same one configuration item, of the configuration items 2102 to 2106 to be the identification candidates.

The case is present where the "Relationships" 2107 to 2111 includes attributes such as the date and time of updating. In this case, the determiner 703 may determine the configuration items that are both connected to the configuration item 2101 by the "Relationship" whose date and time of updating is included in the same day, the same time zone, etc., as the pair that represents one same configuration item.

The output unit 704 outputs the determination result determined. For example, the output unit 704 may output the identification candidate list depicting the configuration items 2102 and 2103 that are determined as the pair representing one same configuration item of the configuration items to be the identification candidates.

According to the information processing apparatus 100 according to the fourth embodiment, the configuration items are able to be narrowed down that are highly likely to be one same configuration item, from the set of the configuration items to be the identification candidates. Thereby, the manager of the FCMDB system 200 is able to easily identify the CI information records to be reconciled on the FCMDB 210.

The information processing method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to an aspect of the present invention, identification of data to be reconciled is facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing therein an information processing program that causes a computer to execute a process, the process comprising:
    referring to relationship property information records that are stored in a storage device and indicate the type of each relationship property between configuration elements in a system and calculating a total count of configuration elements having a predetermined relationship property with a first configuration element, or a total count of relationship property information records having a predetermined relationship property, among relationship property information records concerning the first configuration element;
    executing a conditional determination concerning (1) the number of configuration elements having the predetermined relationship property with the first configuration element, among the calculated total count of configuration elements, (2) the calculated total count of relationship property information records, and (3) a constraint that stipulates the number of configuration elements having the predetermined relationship property with the first configuration element or the number of relationship property information records having the predetermined relationship property with the first configuration element, the conditional determination includes determining whether the total count exceeds a threshold set concerning the number of configuration elements having the predetermined relationship property with the first configuration element; and
    outputting information on configuration elements determined not to satisfy the constraint.

2. The medium according to claim 1, the process further comprising:
    for each combination of an element type of a configuration element and a type of relationship property between configuration elements, extracting a threshold set for the number of configuration elements having the predetermined relationship property with the first configuration element, from condition information indicating the threshold set for the number of configuration elements having a relationship property of the type with a configuration element of the element type, wherein
    the conditional determination includes determination as to whether the total count exceeds the extracted threshold.

3. The medium according to claim 1, the process further comprising:
    for each configuration element of an element type that is the same as the element type of the first configuration element, calculating the total count of configuration elements having the predetermined relationship property with the configuration element that is of the same element type, among the relationship property information records, or the total count of relationship property information records having the predetermined relationship property, among the relationship information concerning the configuration elements of the same element type; and
    based on a calculation result calculated, calculating a threshold for the number of configuration elements having the predetermined relationship property with the configuration element of the same element type, wherein
    the conditional determination includes determination as to whether the total count exceeds the threshold for the calculated number of configuration elements having the predetermined relationship property with the configuration element of the same element type.

4. The medium according to claim 3, wherein the calculating of the threshold includes setting the total count whose appearance rate is greater than or equal to a predetermined rate, among the total counts respectively calculated for the configuration elements of the same element type, to be a threshold for the number of configuration elements having the predetermined relationship property with the configuration element of the same element type.

5. The medium according to claim 4, wherein the calculating of the threshold includes setting the total count whose appearance rate is highest and greater than or equal to the predetermined rate, among the total counts respectively calculated for the configuration elements of the same element type, to be a threshold for the number of configuration elements having the predetermined relationship property with the configuration elements of the same element type.

6. The medium according to claim 4, the process further comprising:
- when the total count exceeds the threshold in the conditional determination, calculating an index value indicating a probability that a set of the configuration elements having the predetermined relationship property with the first configuration element includes the same configuration element, based on the total count and the appearance rate of the total count whose appearance rate is greater than or equal to the predetermined rate set to be the threshold;
- determining whether the calculated index value is at most to a predetermined value; and
- when it is determined that the index value is greater than or equal to the predetermined value, outputting a result indicating that the total count exceeds the threshold in the conditional determination.

7. The medium according to claim 1, the process further comprising:
- when the total count exceeds the threshold in the conditional determination, outputting a set of the configuration elements having the predetermined relationship property with the first configuration element as a set of configuration elements to be identification candidates.

8. The medium according to claim 7, the process further comprising:
- comparing attribute values of configuration elements included in the set of the configuration elements to be the identification candidates;
- based on a comparison result acquired at the comparing, determining combinations of configuration elements representing the same configuration element, from among the set of the configuration elements to be the identification candidates; and
- outputting a determination result of the determination.

9. The medium according to claim 1, the process further comprising:
- when a new configuration element is generated by reconciling the first configuration element and a second configuration element in the system, calculating a total count of configuration elements having the predetermined relationship property with the new configuration element, or a total count of relationship property information records having the predetermined relationship property, among relationship property information records concerning the new configuration element;
- executing conditional determination concerning the number of configuration elements having the predetermined relationship property with the new configuration element, among the calculated total count of the configuration elements or the calculated total count of the relationship property information records; and
- outputting a result of the determination.

10. An information processing apparatus comprising:
- a processor configured to refer to relationship property information records that are stored in a storage device and indicate the type of each relationship property between configuration elements in a system, and calculate a total count of configuration elements having a predetermined relationship property with a first configuration element, or a total count of relationship property information records having a predetermined relationship property, among relationship property information records concerning the first configuration element; and to execute a conditional determination concerning (1) the number of configuration elements having the predetermined relationship property with the first configuration element, among the calculated total count of configuration elements, (2) the calculated total count of relationship property information records, and (3) a constraint that stipulates the number of configuration elements having the predetermined relationship property with the first configuration element or the number of relationship property information records having the predetermined relationship property with the first configuration element, the conditional determination includes determining whether the total count exceeds a threshold set concerning the number of configuration elements having the predetermined relationship property with the first configuration element; and
- an output unit that outputs information on configuration elements determined not to satisfy the constraint.

11. An information processing method executed by a computer, the information processing method comprising:
- referring to relationship property information records that are stored in a storage device and indicate the type of each relationship property between configuration elements in a system and calculating a total count of configuration elements having a predetermined relationship property with a first configuration element, or a total count of relationship property information records having a predetermined relationship property, among relationship property information records concerning the first configuration element;
- executing a conditional determination concerning (1) the number of configuration elements having the predetermined relationship property with the first configuration element, among the calculated total count of configuration elements, (2) the calculated total count of relationship property information records, and (3) a constraint that stipulates the number of configuration elements having the predetermined relationship property with the first configuration element or the number of relationship property information records having the predetermined relationship property with the first configuration element, the conditional determination includes determining whether the total count exceeds a threshold set concerning the number of configuration elements having the predetermined relationship property with the first configuration element; and
- outputting information on configuration elements determined not to satisfy the constraint.

* * * * *